(12) United States Patent
Forgette et al.

(10) Patent No.: US 11,220,226 B2
(45) Date of Patent: Jan. 11, 2022

(54) HEADLINER SYSTEM AND METHOD

(71) Applicant: FORD GLOBAL TECHNOLOGIES, LLC, Dearborn, MI (US)

(72) Inventors: Paul Alan Forgette, Brownstown, MI (US); Amy M. Boardman, Garden City, MI (US); John Andrew Stakoe, Bloomfield Hills, MI (US); Anna Miller Hill, Belleville, MI (US); Robert Ralph Armitage, Jr., Howell, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/945,359

(22) Filed: Jul. 31, 2020

(65) Prior Publication Data

US 2020/0361401 A1 Nov. 19, 2020

Related U.S. Application Data

(62) Division of application No. 16/107,790, filed on Aug. 21, 2018, now abandoned.

(51) Int. Cl.
 *B60R 13/02* (2006.01)
 *B60R 21/02* (2006.01)
 (Continued)

(52) U.S. Cl.
 CPC ...... *B60R 13/0225* (2013.01); *B60R 13/0815* (2013.01); *B60H 2001/00235* (2013.01); *B60J 7/00* (2013.01); *B60R 11/00* (2013.01); *B60R 21/214* (2013.01); *B60R 21/232* (2013.01); *B60R 21/233* (2013.01); *B60R 2011/0028* (2013.01); *B60R 2013/0281* (2013.01);
 (Continued)

(58) Field of Classification Search
 CPC ............ B60R 13/0212; B60R 13/0215; B60R 13/0225; B60R 13/0231; B60R 13/281; B60R 13/0281; B60R 13/0293; B60R 13/015
 USPC ...................................... 296/214, 39.1, 1.08
 See application file for complete search history.

(56) References Cited

U.S. PATENT DOCUMENTS 5,280,991 A 1/1994 Weiland
6,070,902 A 6/2000 Kowalski et al.
(Continued)

FOREIGN PATENT DOCUMENTS

DE 3822258 A1 3/1989
DE 102005008678 A1 8/2006
(Continued)

OTHER PUBLICATIONS

English Machine Translation of JP2678904B2 dated Nov. 19, 1997.
(Continued)

Primary Examiner — Dennis H Pedder
(74) Attorney, Agent, or Firm — David Coppiellie; Price Heneveld LLP

(57) ABSTRACT

A headliner system includes a plurality of segments connected together and outlining a central opening and a central section received in the central opening. The central section is selected from a group of central sections consisting of a multisection panel incorporating an overhead airbag grid system, a panel incorporating a fold down display panel and a panel incorporating a pull down divider.

18 Claims, 20 Drawing Sheets

(51) Int. Cl.

| | | |
|---|---|---|
| *B60R 13/08* | (2006.01) | |
| *B60R 21/231* | (2011.01) | |
| *B60H 1/00* | (2006.01) | |
| *B60R 21/214* | (2011.01) | |
| *B60R 21/232* | (2011.01) | |
| *B60R 21/233* | (2006.01) | |
| *B60J 7/00* | (2006.01) | |
| *B60R 11/00* | (2006.01) | |

(52) U.S. Cl.
CPC ........... *B60R 2013/0287* (2013.01); *B60R 2021/23107* (2013.01); *B60R 2021/23153* (2013.01); *B60R 2021/23308* (2013.01)

(56) References Cited

U.S. PATENT DOCUMENTS

| | | | |
|---|---|---|---|
| 6,079,732 A | 6/2000 | Nakajima et al. | |
| 6,082,761 A | 7/2000 | Kato et al. | |
| 6,120,091 A | 9/2000 | Reich et al. | |
| 6,135,491 A | 10/2000 | Olson et al. | |
| 6,257,616 B1 | 7/2001 | Nowak et al. | |
| 6,377,220 B1 | 4/2002 | Cook et al. | |
| 6,523,887 B1 | 2/2003 | Picken et al. | |
| 6,705,636 B2 | 3/2004 | Takahara | |
| 7,000,980 B2 | 2/2006 | Lutz et al. | |
| 7,182,908 B2 | 2/2007 | Preisler et al. | |
| 7,237,834 B2 | 7/2007 | Czinki et al. | |
| 7,481,448 B2 | 1/2009 | Heigl et al. | |
| 7,922,135 B2 | 4/2011 | Granata | |
| 8,251,440 B2 | 8/2012 | Zarewych et al. | |
| 8,764,891 B1 | 7/2014 | Brown | |
| 8,876,200 B2 | 11/2014 | Huelke et al. | |
| 9,272,451 B2 | 3/2016 | Reese | |
| 9,725,064 B1* | 8/2017 | Faruque | B60N 2/143 |
| 9,789,840 B2* | 10/2017 | Farooq | B60R 21/214 |
| 9,902,362 B2* | 2/2018 | Farooq | B60N 2/14 |
| 10,343,642 B2* | 7/2019 | Faruque | B60R 21/23184 |
| 2001/0042935 A1 | 11/2001 | Barber et al. | |
| 2002/0125742 A1 | 9/2002 | Luik et al. | |
| 2002/0190508 A1 | 12/2002 | Jost | |
| 2002/0195844 A1 | 12/2002 | Hipwell | |
| 2003/0011214 A1 | 1/2003 | Gupte et al. | |
| 2003/0194542 A1 | 10/2003 | Springer | |
| 2004/0198123 A1 | 10/2004 | Gillingham et al. | |
| 2005/0258559 A1 | 11/2005 | Johansen et al. | |
| 2006/0192367 A1* | 8/2006 | Zumpano | B60R 21/18 280/730.1 |
| 2007/0126215 A1 | 6/2007 | Choi | |
| 2007/0152431 A1 | 7/2007 | John et al. | |
| 2008/0056810 A1 | 3/2008 | Granta | |
| 2008/0100100 A1 | 5/2008 | Huisman | |
| 2008/0258507 A1 | 10/2008 | Dykman et al. | |
| 2008/0272623 A1 | 11/2008 | Kadzban et al. | |
| 2009/0211065 A1 | 8/2009 | Moerke | |
| 2010/0148530 A1 | 6/2010 | Michler | |
| 2010/0253114 A1 | 10/2010 | Ohmiya et al. | |
| 2011/0062694 A1* | 3/2011 | Spencer | B60R 21/232 280/743.2 |
| 2013/0334843 A1 | 12/2013 | Schweindl et al. | |
| 2014/0084636 A1 | 3/2014 | Wimmer et al. | |
| 2014/0265456 A1 | 9/2014 | Huelke | |
| 2016/0176378 A1 | 6/2016 | Thomas, Jr. | |
| 2018/0079373 A1 | 3/2018 | Tejido et al. | |
| 2018/0170283 A1 | 6/2018 | Liu et al. | |
| 2018/0215338 A1* | 8/2018 | Faruque | B60R 21/214 |
| 2018/0236961 A1 | 8/2018 | Ideta et al. | |
| 2020/0061894 A1 | 2/2020 | Forgette et al. | |
| 2020/0062195 A1 | 2/2020 | Forgette et al. | |
| 2020/0062196 A1 | 2/2020 | Forgette et al. | |

FOREIGN PATENT DOCUMENTS

| | | |
|---|---|---|
| DE | 102015216526 A1 | 3/2017 |
| DE | 102016204469 A1 | 9/2017 |
| EP | 1369340 A2 | 12/2003 |
| EP | 1389567 A2 | 2/2004 |
| JP | 2678904 B2 | 11/1997 |

OTHER PUBLICATIONS

English Machine Translation of EP1389567A2 dated Feb. 18, 2004.
English Machine Translation of EP1369340A2 dated Dec. 10, 2003.
English Machine Translation of DE102015216526A1 dated Mar. 2, 2017.
Non-Final Office Action dated Oct. 24, 2019 for U.S. Appl. No. 16/107,856, filed Aug. 21, 2018.
Office Action dated Jan. 22, 2020 for U.S. Appl. No. 16/107,856, filed Aug. 21, 2018.
Office Action dated Apr. 9, 2020 for U.S. Appl. No. 16/107,923, filed Aug. 21, 2018.
Office Action dated Dec. 12, 2019 for U.S. Appl. No. 16/107,790, filed Aug. 21, 2018.
Office Action dated Feb. 27, 2020 for U.S. Appl. No. 16/107,790, filed Aug. 21, 2018.
English Machine Translation of DE102016204469A1 dated Sep. 21, 2017.
English Machine Translation of DE3822258A1 dated Mar. 2, 1989.
English Machine Translation of DE102005008678 dated Aug. 31, 2006.

* cited by examiner

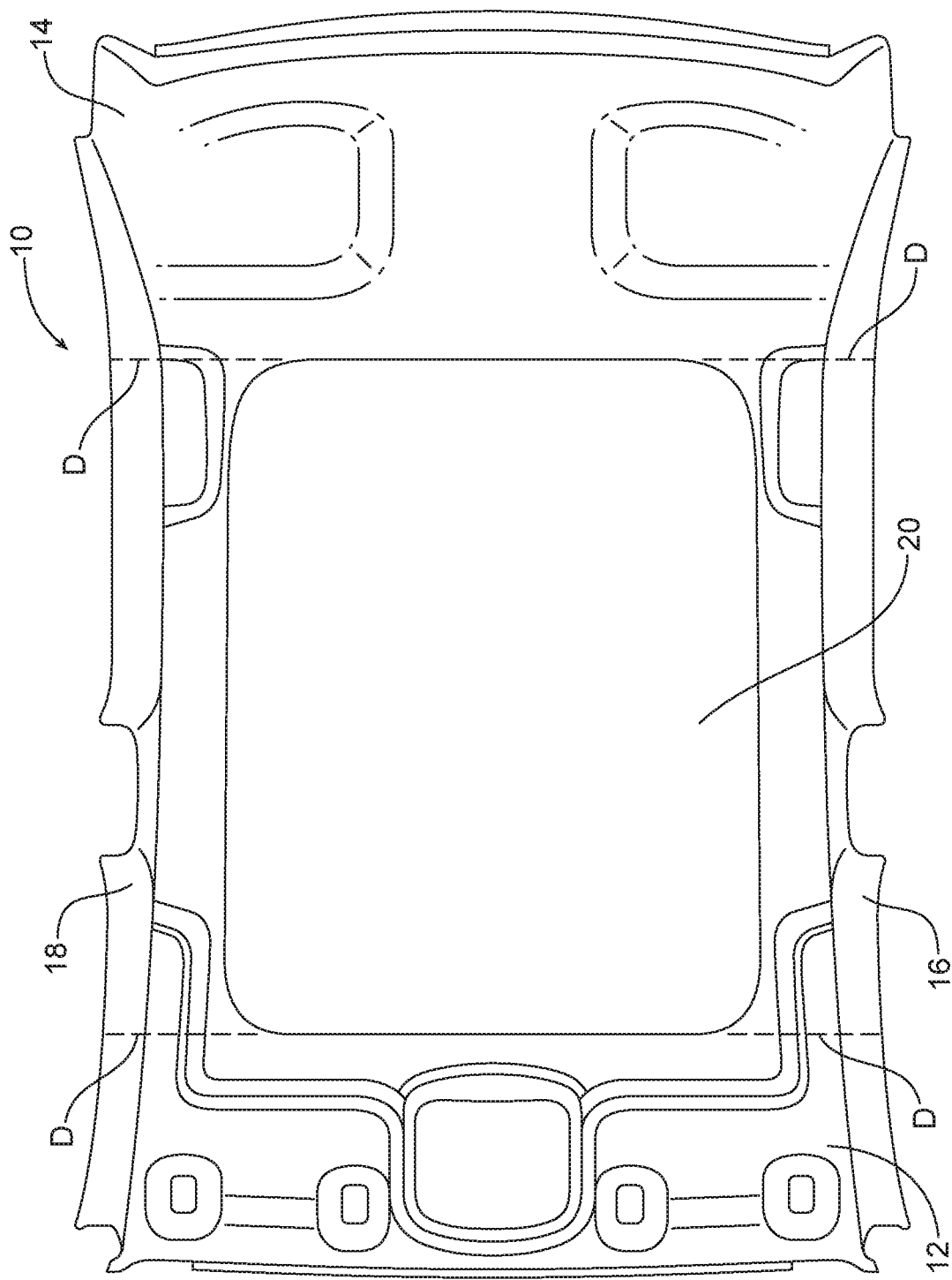

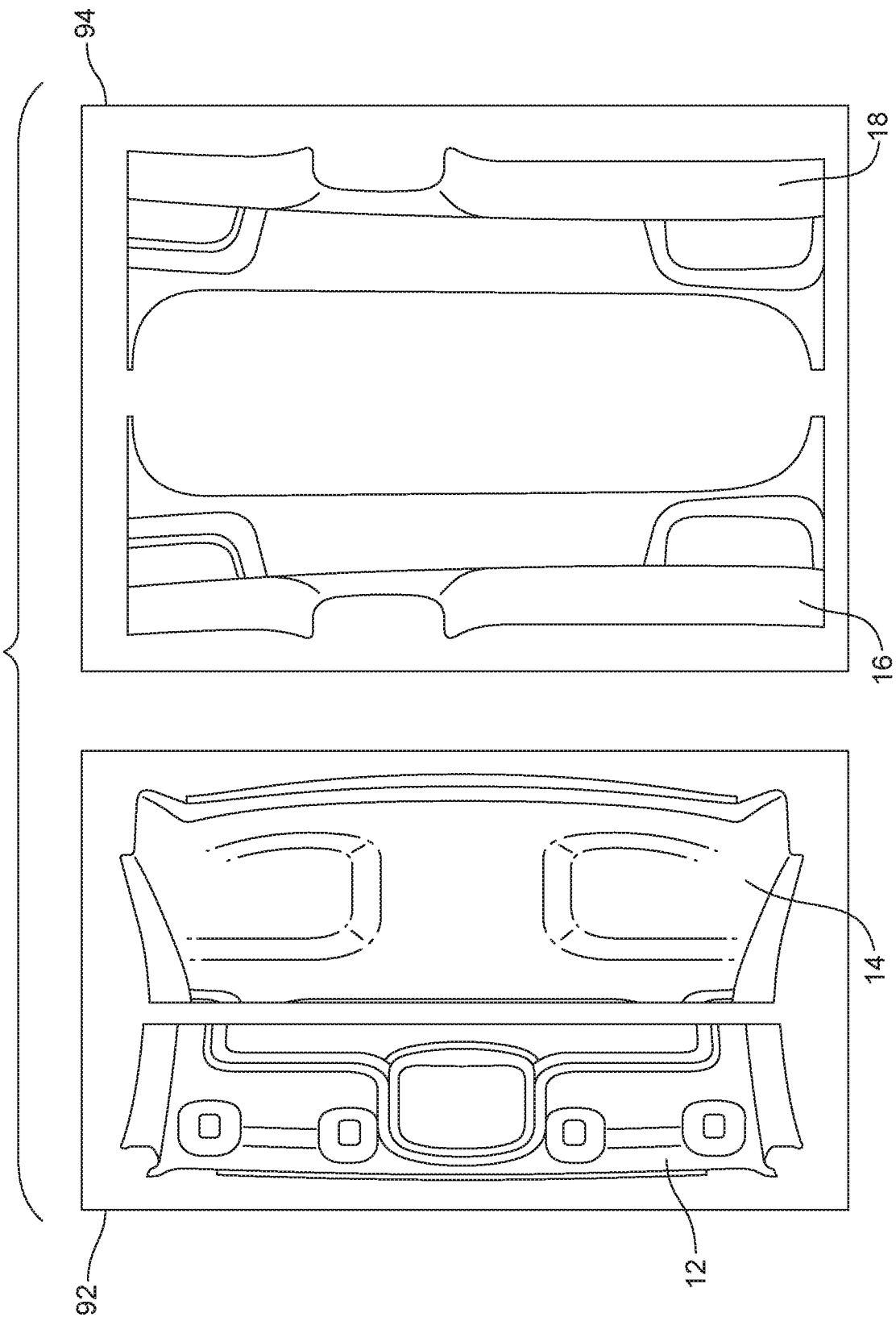

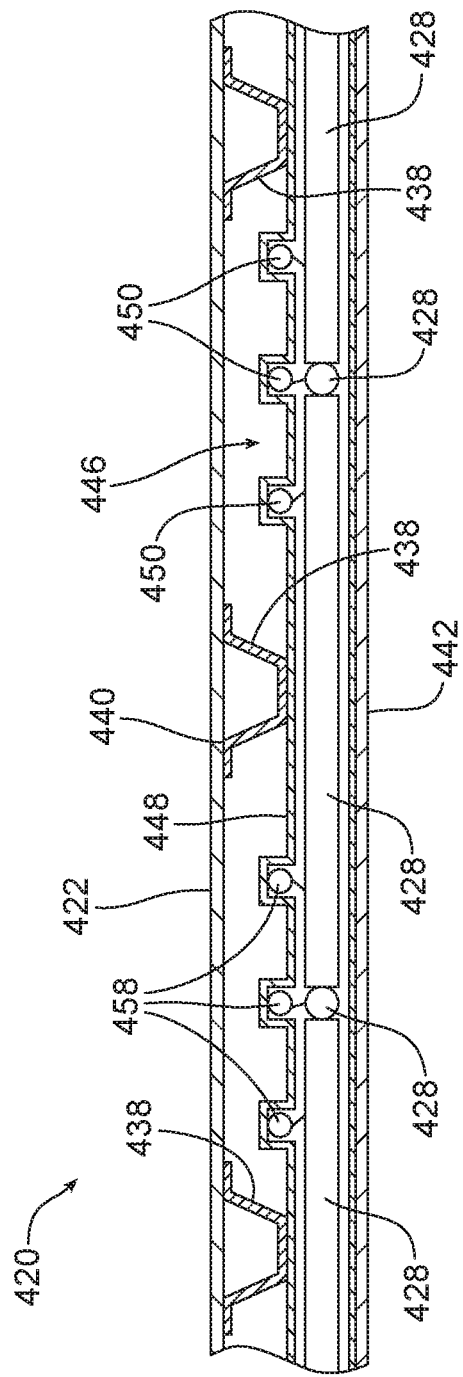

HEADLINER SYSTEM AND METHOD

This application is a divisional of U.S. patent application Ser. No. 16/107,790 filed on 21 Aug. 2018, the full disclosure of which is incorporated herein by reference.

TECHNICAL FIELD

This document relates generally to the motor vehicle equipment field and, more particularly, to a new and improved headliner made from a plurality of segments.

BACKGROUND

State of the art processes for producing vehicle headliner or overhead systems rely upon many different types of materials, tools and processes from various supplier companies. Those supplier companies may be located near and far from the original equipment manufacturer and a complex network of shipping logistics is required to ensure production schedules are met. In addition, many types of tools, equipment, processes, materials and people are required to assemble the various parts into the vehicle headliner or overhead system.

In the past a central opening was cut in the headliner for panorama and sun roof assembly features. The removed central section was effectively rendered scrap for the landfill. Advantageously, the new segmented headliner reduces the material costs, environmental costs and landfill costs associated with this removed central section. As a result, the segmented headliner is produced in a more cost effective and efficient manner.

In addition, each segment of the headliner includes a headliner substrate thermoformed from a polypropylene glass matte technology (PP/GMT) blank and a secondary component simultaneously injection molded onto the headliner substrate in a new combined hybrid process that culminates in a subsequent step of laminating a surface covering of the headliner substrate. By simultaneously molding the secondary components to the headliner substrate of each headliner segment as the headliner substrate is being formed, engineering/design time, part cost and tooling efficiencies are improved by reducing many of the component tools, processes and logistics that are required to make the motor vehicle headliner or overhead system.

This document relates to a new and improved headliner assembled from a plurality of segments that may be connected together and outline a central opening for a panorama roof, a sun roof assembly or other feature as desired by the customer.

SUMMARY

In accordance with the purposes and benefits as described herein, a new and improved headliner is provided. That headliner comprises a plurality of segments connected together and outlining a central opening. A central section is received in and closes the central opening. That central section may be selected from a group consisting of a noise, vibration and harshness panel, a radiant heat source panel, a reflective heat source panel, a multisection panel incorporating an overhead air bag grid system, a display panel, a central panel including a pull-down divider, an aesthetic panel, a panorama roof panel, a sun roof panel or combinations thereof.

In one possible embodiment, the noise, vibration and harshness panel, the radiant heat source panel, the reflective heat source panel, the multisection panel incorporating the overhead air bag grid system, the display panel, the central panel including the pull-down divider, the aesthetic panel, the panorama roof panel, the sun roof panel or combinations thereof are interchangeable. As a result, the headliner system has unparallel versatility allowing the headliner system to be tailored to different motor vehicle models and various customer preferences. Further, production costs are significantly reduced.

The plurality of segments may include a first segment, a second segment, a third segment and a fourth segment. In one of many possible embodiments, the first segment is a front header, the second segment is a rear header, the third segment is a right hand side rail and the fourth segment is a left hand side rail. Each of the plurality of segments may comprise (a) a unitary body including a substrate having an A surface and a B surface, (b) a secondary component carried on the B surface and (c) a laminated surface covering the A surface.

In accordance with an additional aspect, a method is provided for reducing headliner production costs for a motor vehicle line. That method comprises the steps of: (a) producing a plurality of headliner segments, (b) connecting the plurality of headliner segments together and outlining a central opening with the plurality of segments and (c) inserting a central section into the plurality of headliner segments.

The method may further include the step of configuring the central opening to receive any one of a plurality of different central sections incorporating different headliner features. Still further, the method may include the step of selecting said central section from a group of interchangeable central sections consisting of a noise, vibration and harshness panel, a radiant heat source panel, a reflective heat source panel, a multisection panel incorporating an overhead air bag grid system, a display panel, a central panel including a pull-down divider, an aesthetic panel, a panorama roof panel, a sun roof panel or combinations thereof, whereby a plurality of motor vehicles may be equipped with said different headliner features.

Still further, the method may also include the step of simultaneously thermoforming a blank into the plurality of headliner segments and injection molding a secondary component onto the headliner segments. In addition, the method may include the step of laminating a surface covering to the headliner segments.

In the following description, there are shown and described several preferred embodiments of the headliner system and related method of reducing headliner production costs for a motor vehicle product line. As it should be realized, the headliner system and method are capable of other, different embodiments and their several details are capable of modification in various, obvious aspects all without departing from the headliner system and method as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the segmented headliner and together with the description serve to explain certain principles thereof.

FIG. 1 is a bottom plan view of the segmented headliner illustrating the plurality of segments that are connected together and outline a central opening.

FIG. 2 illustrates the four individual segments of the segmented headliner illustrated in FIG. 1 with the front and rear header segments held in a first platen and the left paint and right hand side rail segments held in a second platen.

Figure 9:
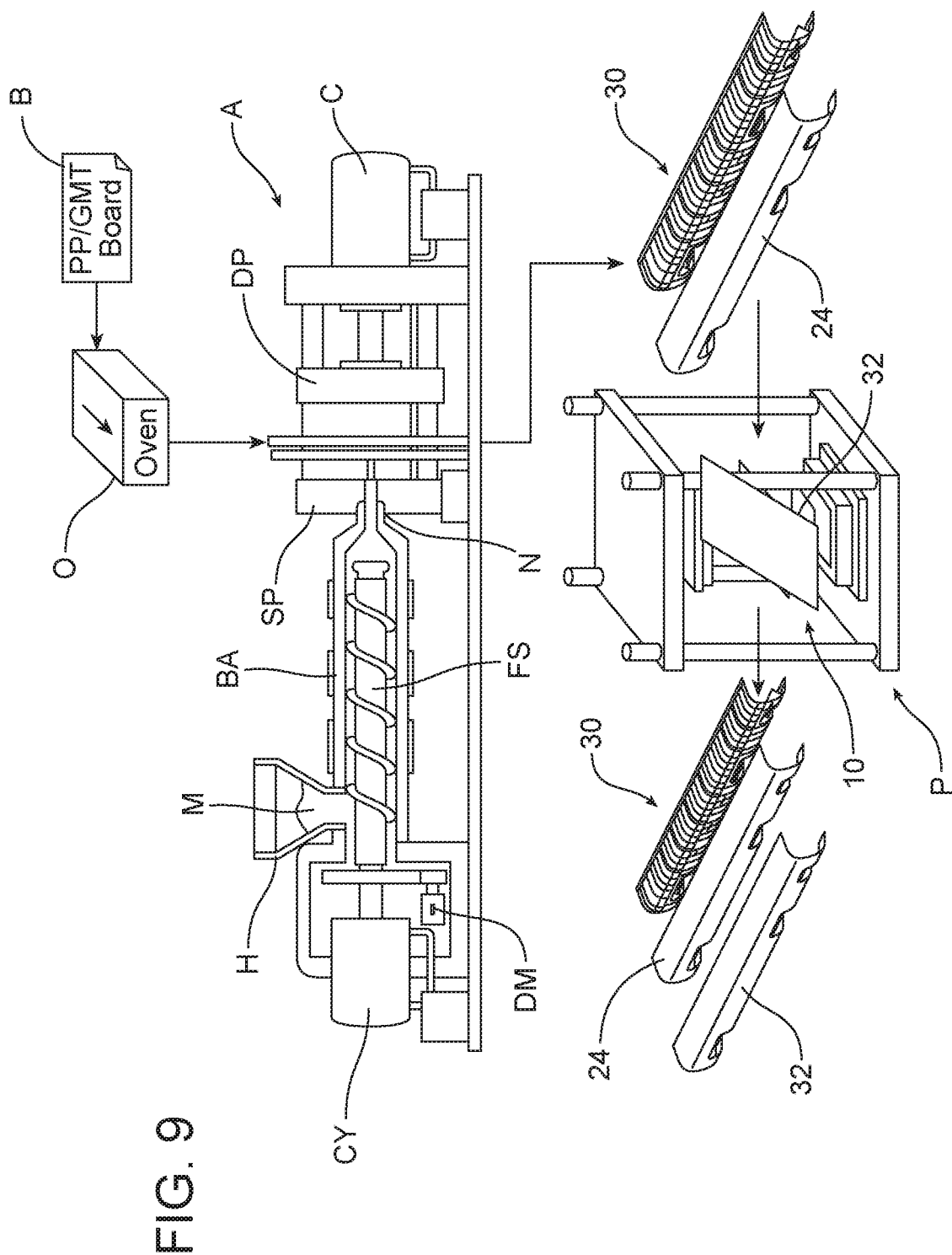

FIG. 9 is a schematic illustration of the method for producing the headliner illustrating (a) the oven for heating the blank from which the headliner substrate of each segment is thermoformed, (b) the combined thermoforming and injection molding apparatus that thermoforms the blank into the headliner substrate and injection molds a secondary component onto the B surface of the headliner substrate and (c) the laminating press utilized to subsequently laminate a surface covering onto the A surface of the headliner substrate.

Figure 10:
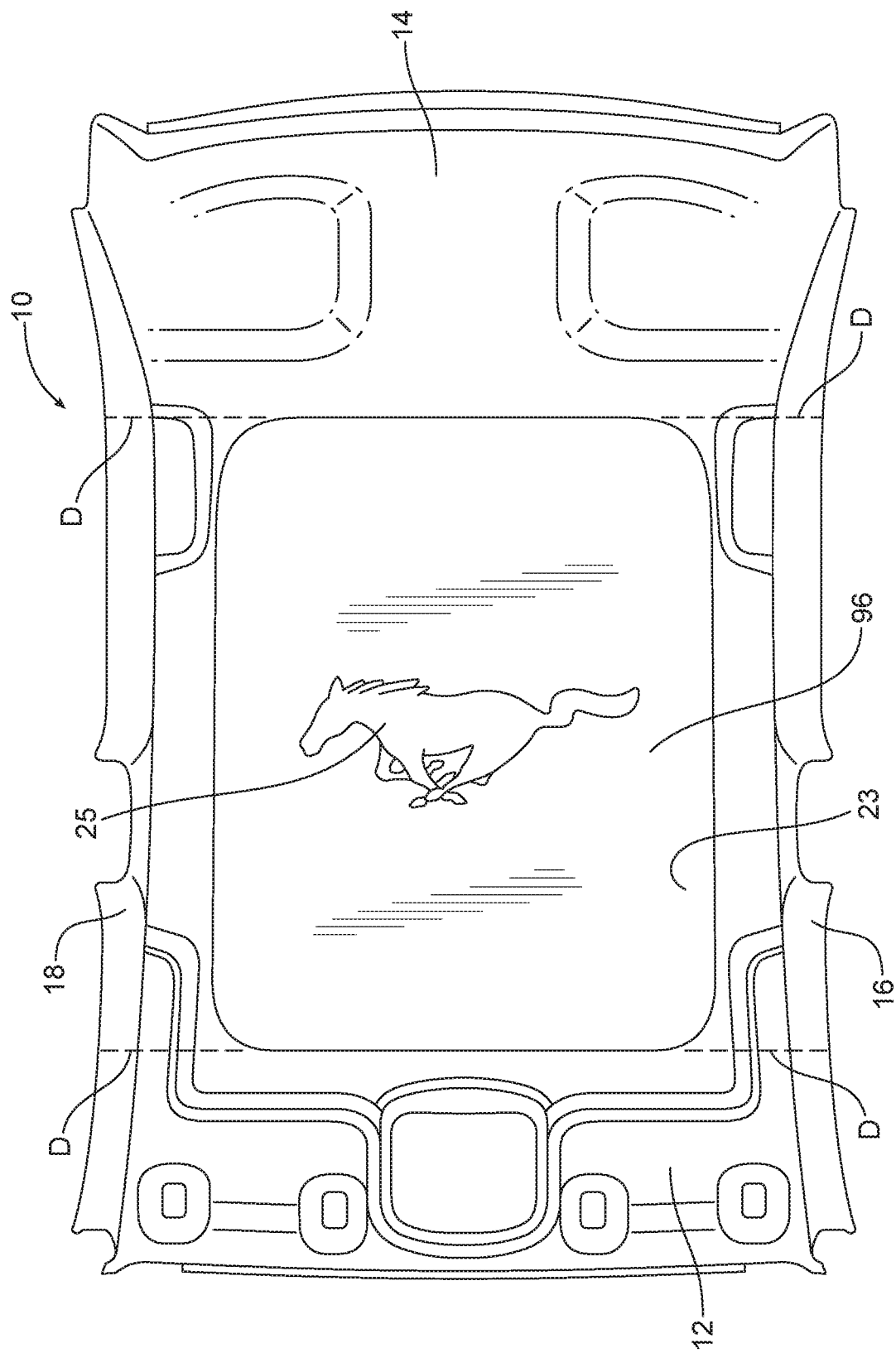

FIG. 10 is a view similar to FIG. 1 but showing an alternative embodiment of the headline substrate incorporating a fifth segment or central section closing the central opening and forming a continuous headliner for a full roof motor vehicle.

Figure 11:
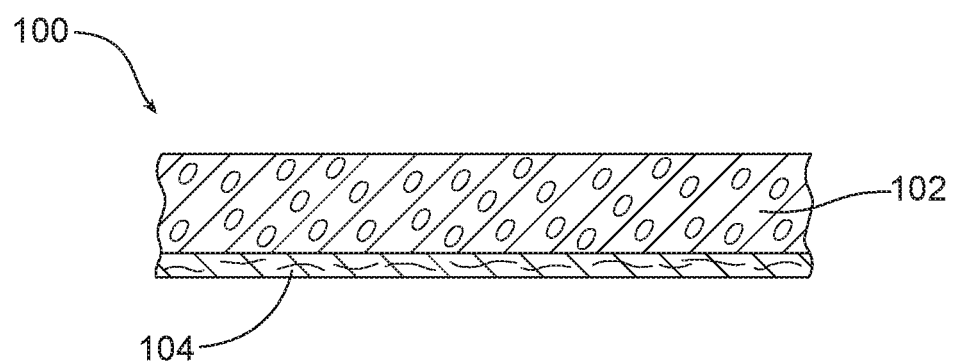

FIG. 11 is a detailed cross sectional view of an aesthetic and noise, vibration and harshness panel for the central section of the headliner system.

Figure 12A:
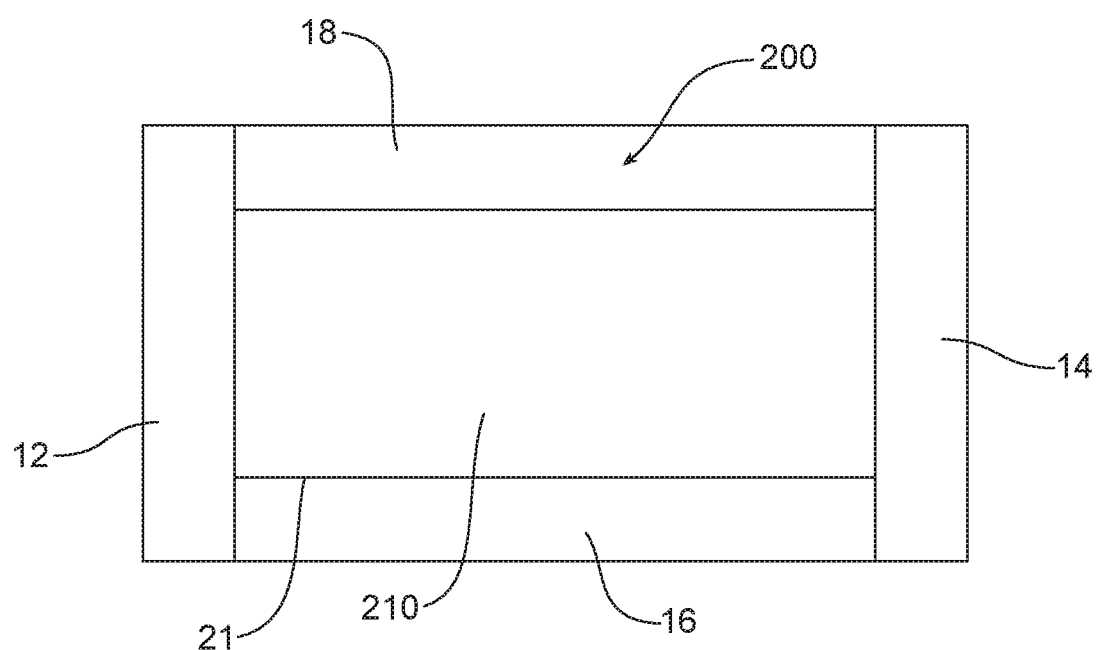

FIG. 12A is a bottom plan schematic view of a radiant heat source panel for the central section of the headliner system.

Figure 12B:
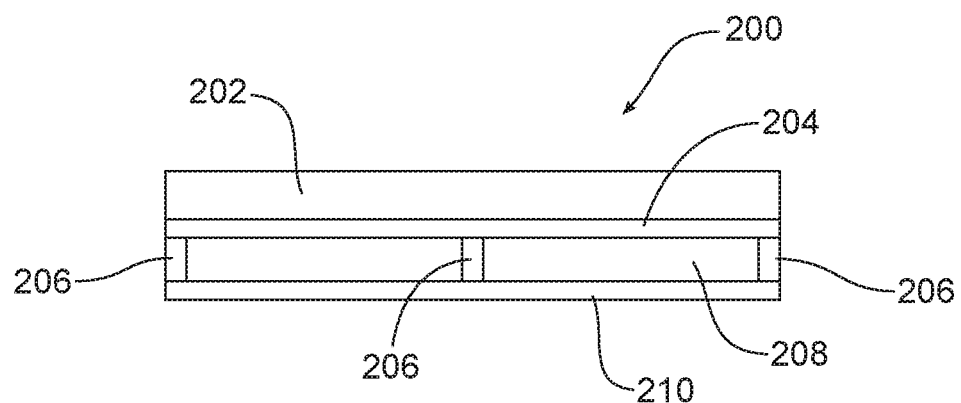

FIG. 12B is a schematic end view of the radiant heat source panel illustrated in FIG. 12A.

Figure 13:
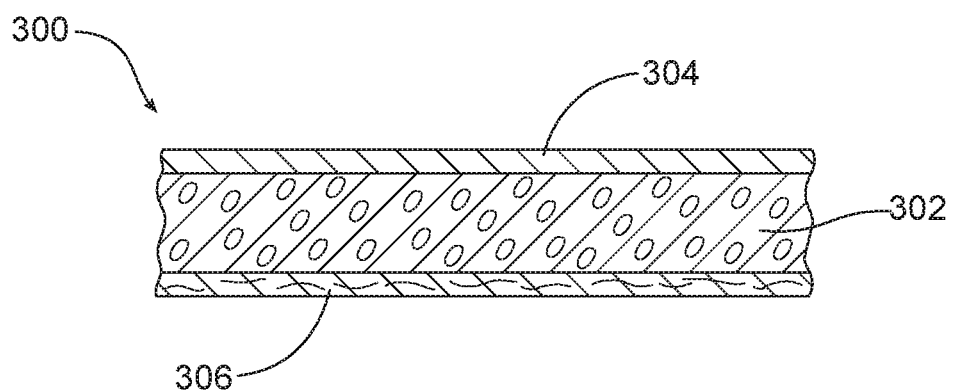

FIG. 13 is a detailed cross sectional view of a reflective heat source panel for the central section of the headliner system.

Figure 14A:
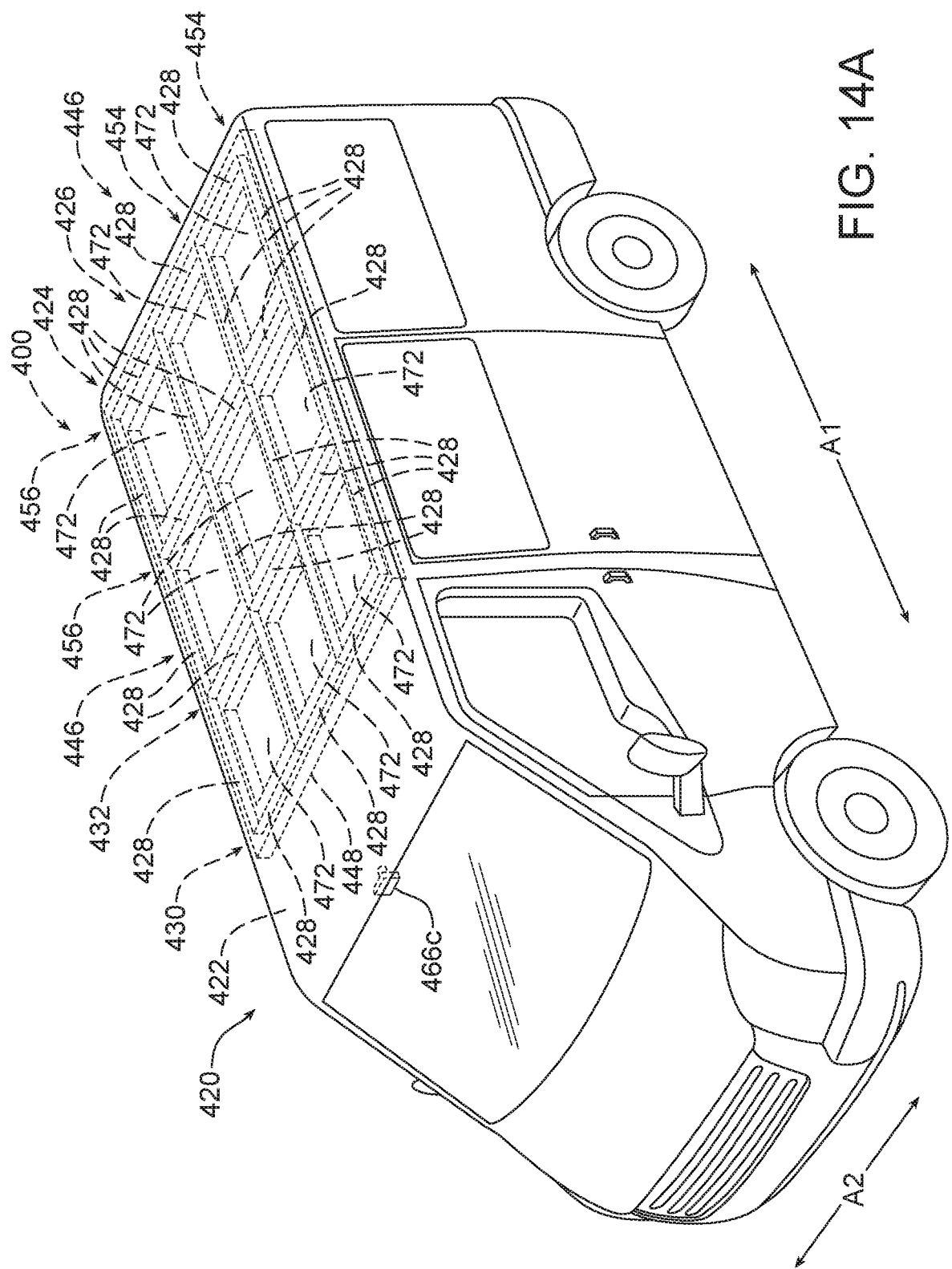

FIG. 14A is a perspective view of a motor vehicle including a headliner system having a central section comprising a multisection panel incorporating an overhead air bag grid system showing that air bag grid system in a home position.

Figure 14B:
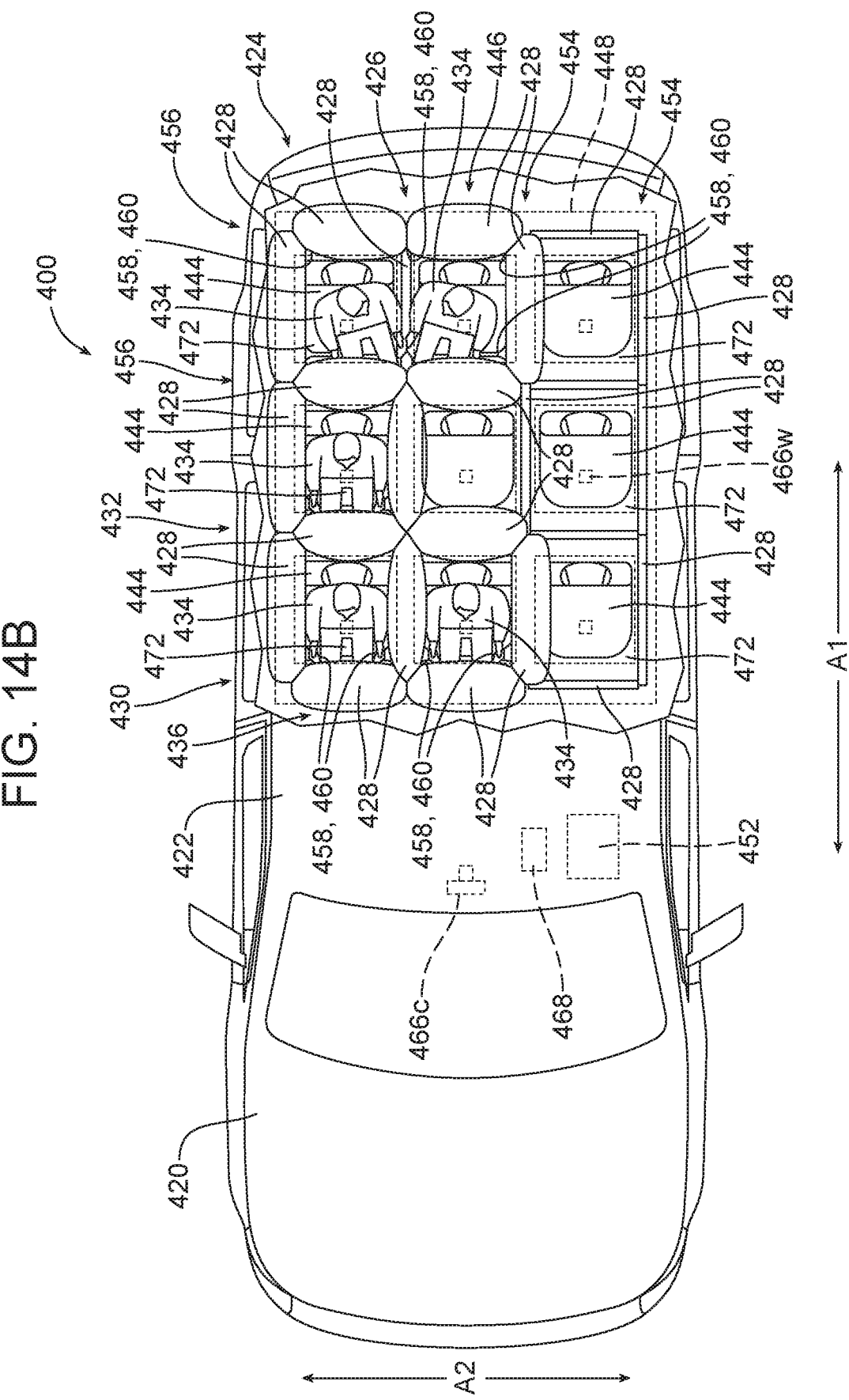

FIG. 14B illustrates the overhead air bag grid system in a deployed position.

FIG. 14C is a cross section of the multisection panel incorporating an overhead air bag grid system as illustrated in FIGS. 14A and 14B.

Figure 15A:
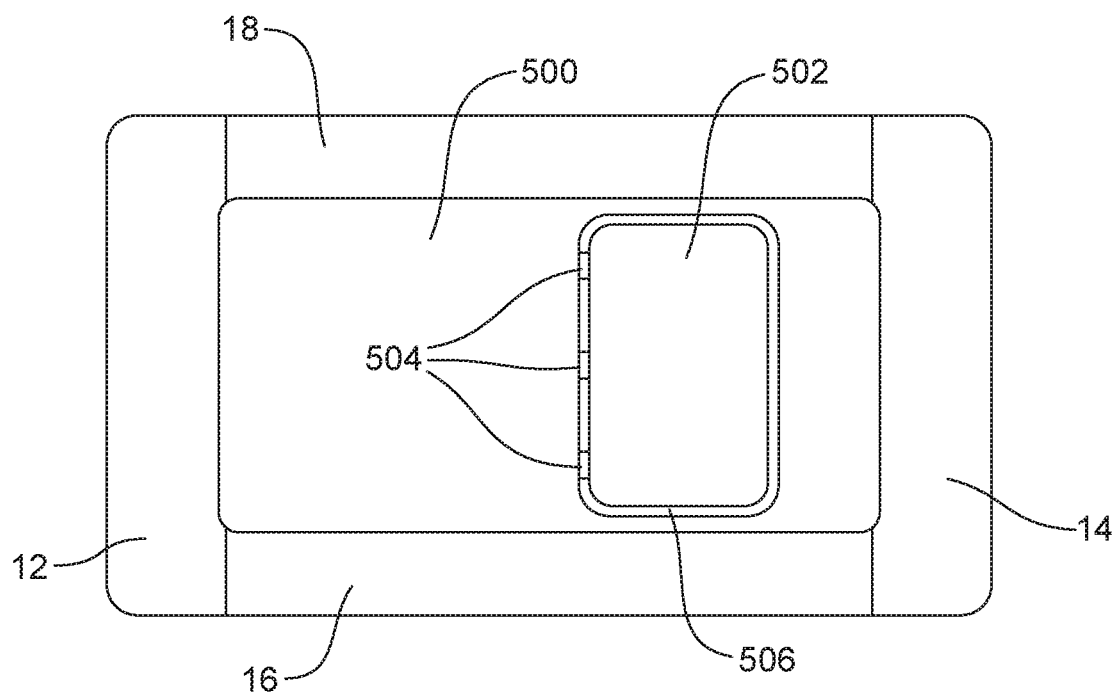

FIG. 15A is a schematic bottom plan view of a display panel for the central section of the headliner system.

Figure 15B:
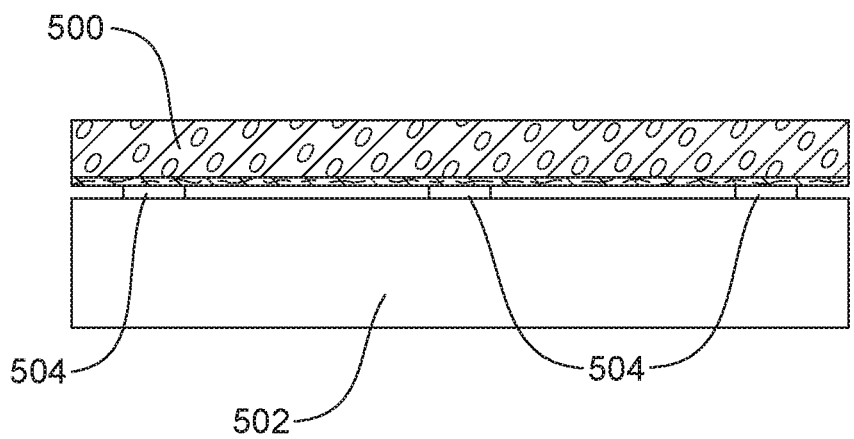

FIG. 15B is an end view of the display panel illustrated in FIG. 15A but showing the display panel in a deployed position.

Figure 16A:
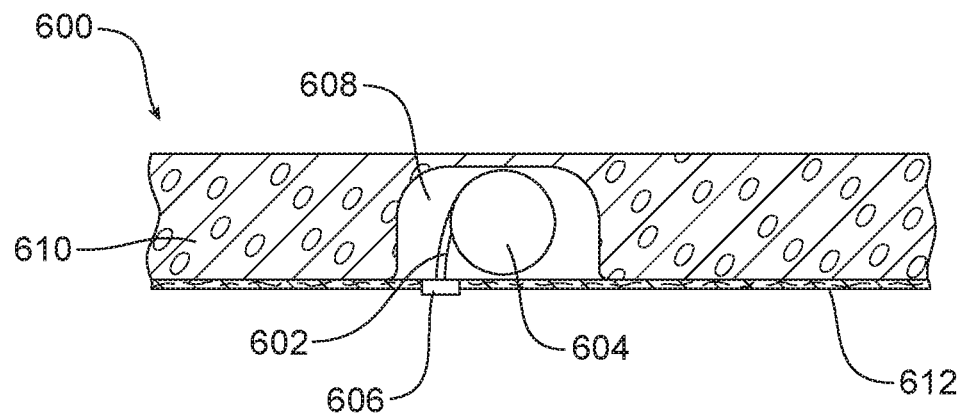

FIG. 16A is a detailed, schematic cross sectional view of a central panel including a pull-down divider for the central section of the headliner system illustrating the divider in a stowed position.

Figure 16B:
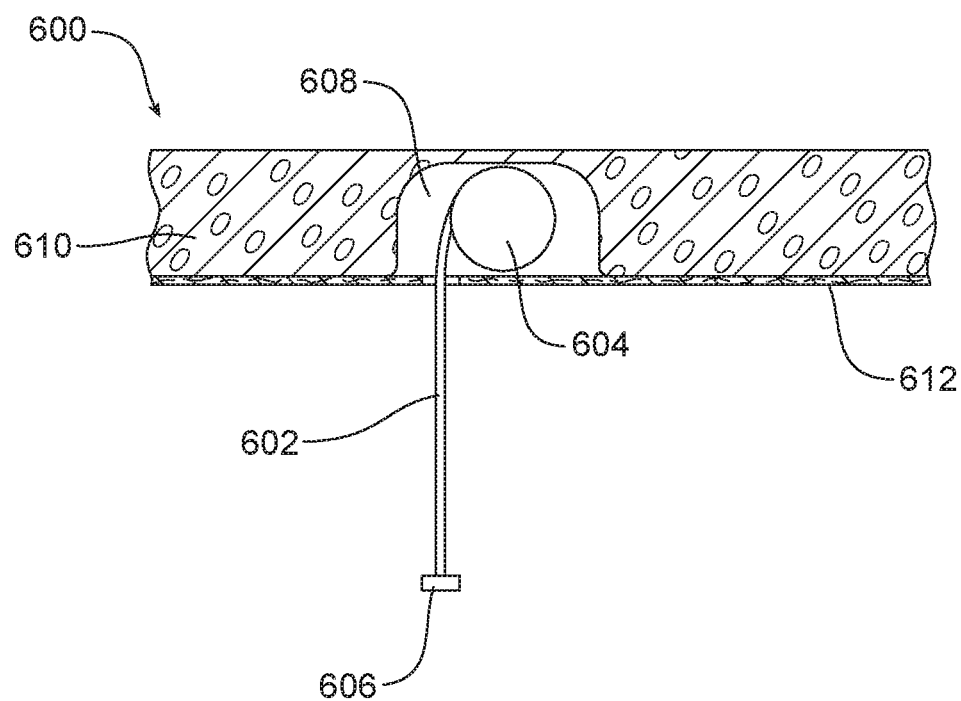

FIG. 16B is a view similar to FIG. 16A but showing the divider in a deployed position.

Figure 17:
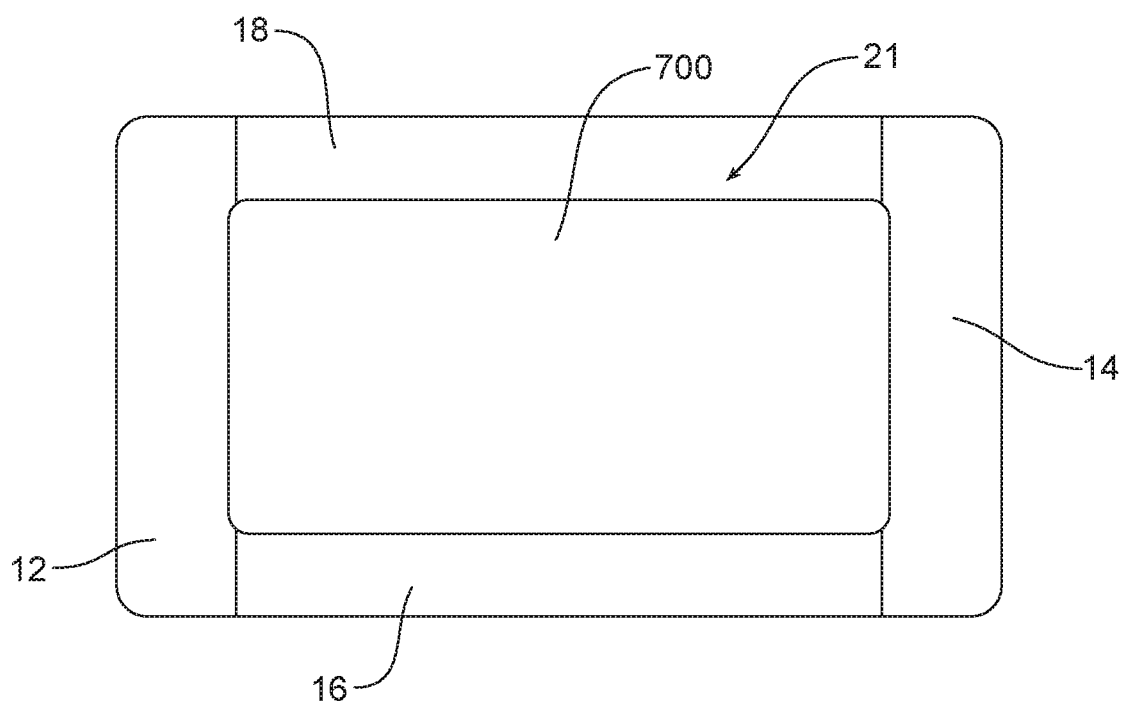

FIG. 17 is a bottom plan view of a panorama roof panel for the central section of the headliner system.

Figure 18:
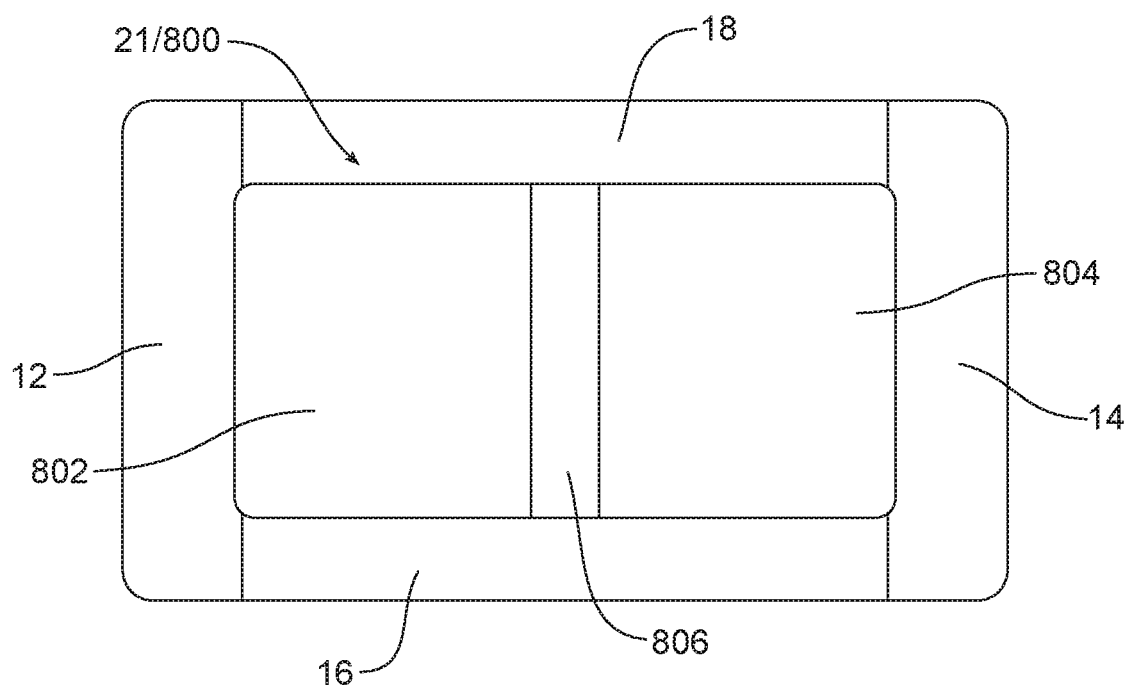

FIG. 18 is a bottom plan view of a sun roof panel for the central section of the headliner system.

Reference will now be made in detail to the present preferred embodiments of the segmented headliner, examples of which are illustrated in the accompanying drawing figures.

DETAILED DESCRIPTION

Reference is now made to FIGS. 1 and 2 illustrating the new and improved headliner system 10. That headliner system 10 comprises a plurality of segments 12, 14, 16, 18 that are connected together and outline a central opening 20. A central section 21 is received and held on that central opening 20. The central section 21 is selected from a group including, but not necessarily limited to: an aesthetic panel or noise, vibration and harshness panel 100 as illustrated in FIG. 11, a radiant heat source panel 200 as illustrated in FIGS. 12A and 12B, a reflective heat source panel 300 as illustrated in FIG. 13, a multisection panel incorporating an overhead air bag grid system 400 as illustrated in FIGS. 14A-14C, a display panel 500 as illustrated in FIGS. 15A and 15B, a central panel 600 including a pull down divider 602 as illustrated in FIGS. 16A and 16B, a panorama roof panel 700 as illustrated in FIG. 17 and a sun roof panel 800 as illustrated in FIG. 18.

The various embodiments of the central section 21 represented by the various panels 100, 200, 300, 400, 500, 600, 700, 800 are all adapted or configured to be received and held in the central opening outlined by the joined segments 12, 14, 16, 18. Thus, it should be appreciated that the various panels 100, 200, 300, 400, 500, 600, 700, 800 are interchangeable. This advantageously allows the manufacturer to tailor the headliner system 10 to incorporate various features across a motor vehicle model line in order to meet wide ranging customer demands. Thus, the headliner system 10 is able to provide wide ranging model diversity to optimize customer satisfaction while simultaneously lowering assembly and production costs.

In the illustrated embodiment, the first segment 12 is a front header, the second segment 14 is a rear header, the third segment 16 is a right hand side rail and the fourth segment 18 is a left hand side rail. The dashed lines D generally illustrate where the four segments 12, 14, 16, 18 are joined together.

Each of the segments, 12, 14, 16, 18 may include a unitary body 22 including (a) a substrate 24 having an A surface 26 and a B surface 28, (b) a secondary component 30 carried on the B surface and (c) a laminated surface covering 32 covering the A surface. See, for example, FIGS. 4 and 5.

As will be described in greater detail below, the substrate may be formed from a polypropylene glass matte technology (PP/GMT) blank B. The secondary component 30 may be injection molded from a material that is compatible with and will fuse with the polypropylene substrate material. That secondary component material may be selected from a group consisting of glass or mineral filled polypropylene and combinations thereof. The surface covering 32 may be made from any appropriate material including, but not necessarily limited to, a material selected from a group consisting of cloth, woven cloth, knit cloth, suede, leather, non-woven cloth, woodgrain film, metallic film, camo film, carbon fiber film and combinations thereof.

Figure 4:
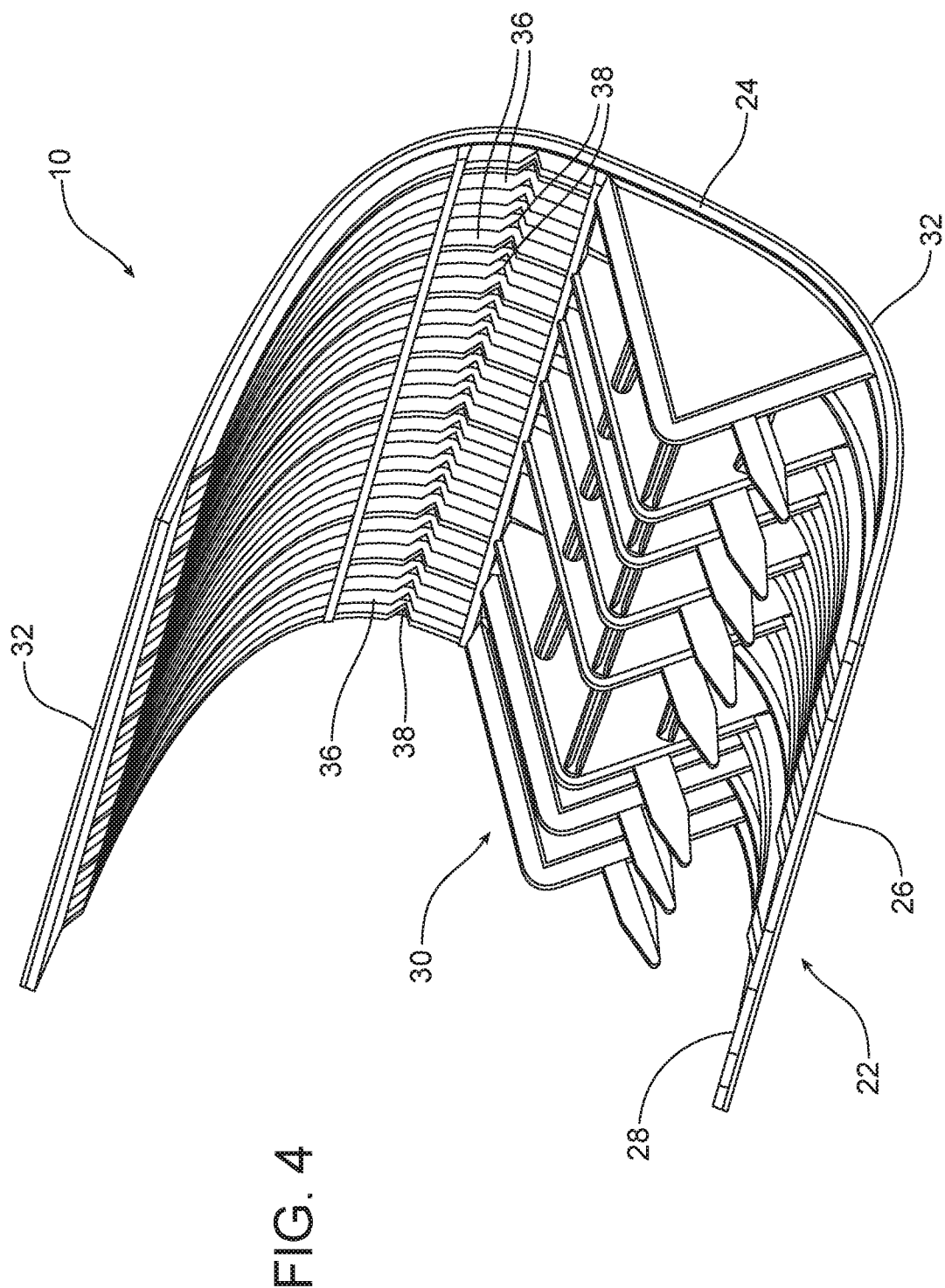
FIG. 4 is a perspective view of one possible embodiment of the headliner substrate wherein the illustrated segment includes a secondary component in the form of a side air curtain deployment feature.

In the embodiment illustrated in FIG. 4, the secondary component 30 comprises a side air curtain deployment feature incorporating a plurality of ribs 36 having notches 38 configured to allow the substrate 24 to flex in a precise and repeatable manner for proper air curtain deployment.

Figure 5:
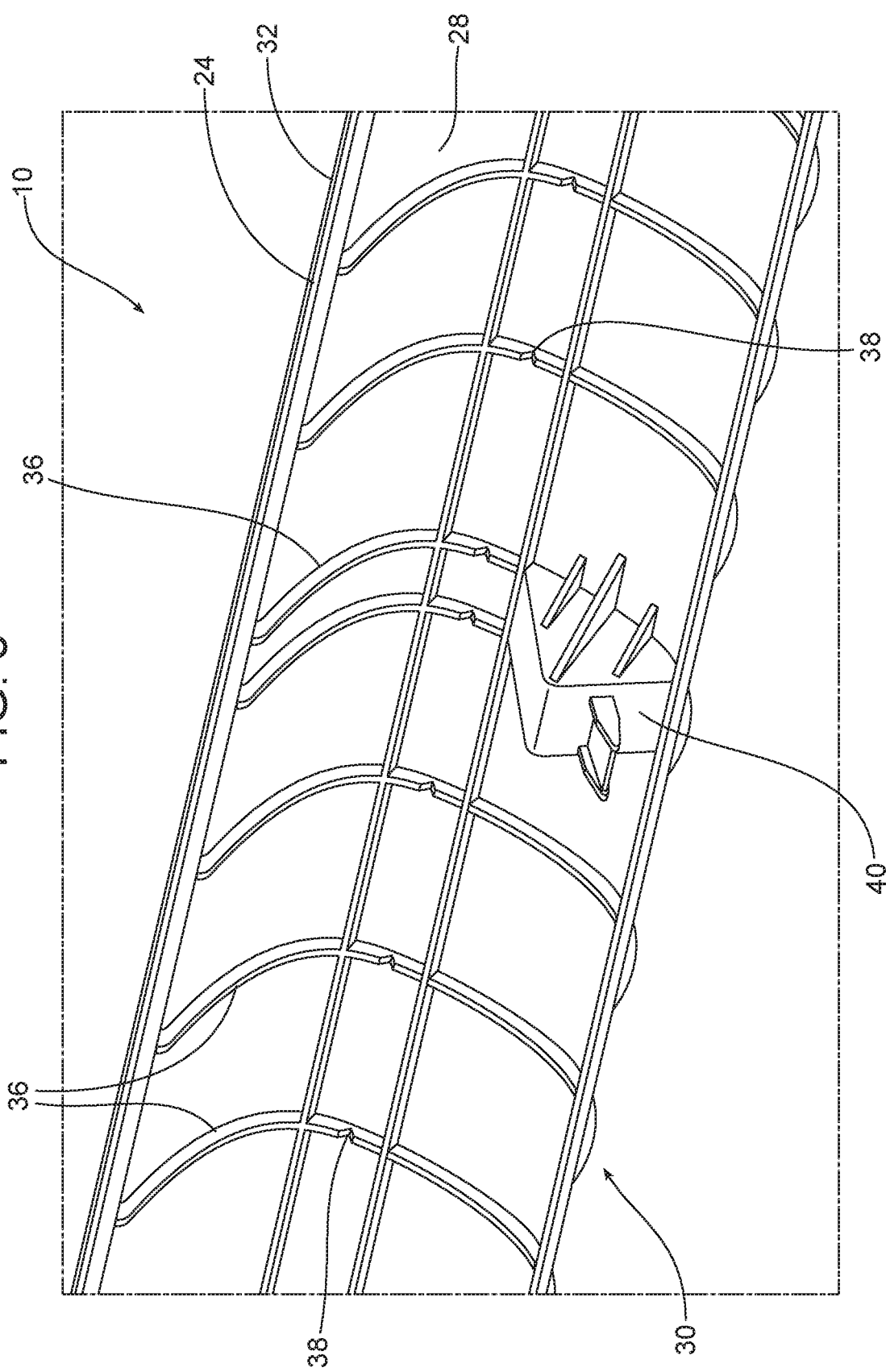
FIG. 5 is a perspective view of one possible embodiment of the segmented headliner wherein the illustrated segment includes a secondary feature in the form of a bracket and an integral reinforcement in the form of a plurality of ribs.

In the embodiment of the headliner system 10 illustrated in FIG. 5 the secondary component 30 comprises an integral attachment feature in the form of a bracket 40 and an integral reinforcement in the form of a plurality of ribs 36. The bracket 40 may be adapted to secure the headliner system 10 to part of the metal superstructure of the motor vehicle or adapted to receive a fastener to secure another component, such as a coat hook or grab handle, to the headliner system. The reinforcement ribs 36 may be adapted to retain the shape of the headliner system 10 when the headliner system is secured to the roof substrate (not shown) of the motor vehicle. The ribs 36 may also include notches 38 if desired. The ribs 36 may also manage energy absorbing requirements.

Figure 6:
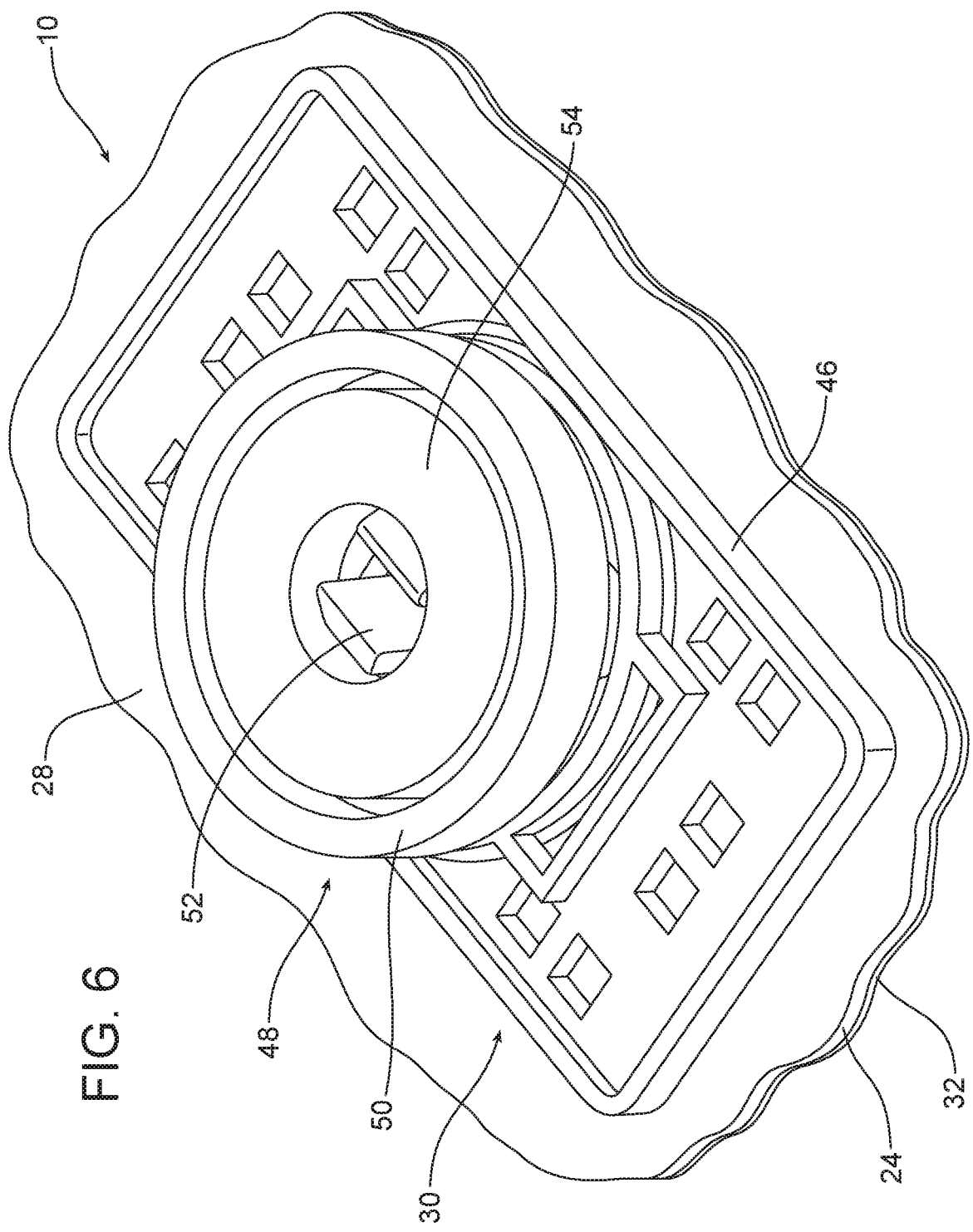
FIG. 6 is a view of yet another alternative embodiment of the segmented headliner wherein the illustrated segment incorporates a secondary component in the form of a bracket adapted to receive a magnetic fastener used to secure the finished segment to the metal roof substrate of a motor vehicle.

FIG. 6 illustrates yet another alternative embodiment of the headliner system 10 wherein the secondary component 30 comprises a bracket 46 adapted to receive and hold a magnetic fastener 48 of a type utilized to secure the headliner to its sheet metal roof substrate of the motor vehicle. The magnetic fastener 48 is secured to the bracket 46. In the illustrated embodiment, that magnetic fastener 48 includes a cup or umbrella 50 fixed to the post 52 of the bracket 46. The cup 50 receives and holds a magnet 54.

Figure 7:
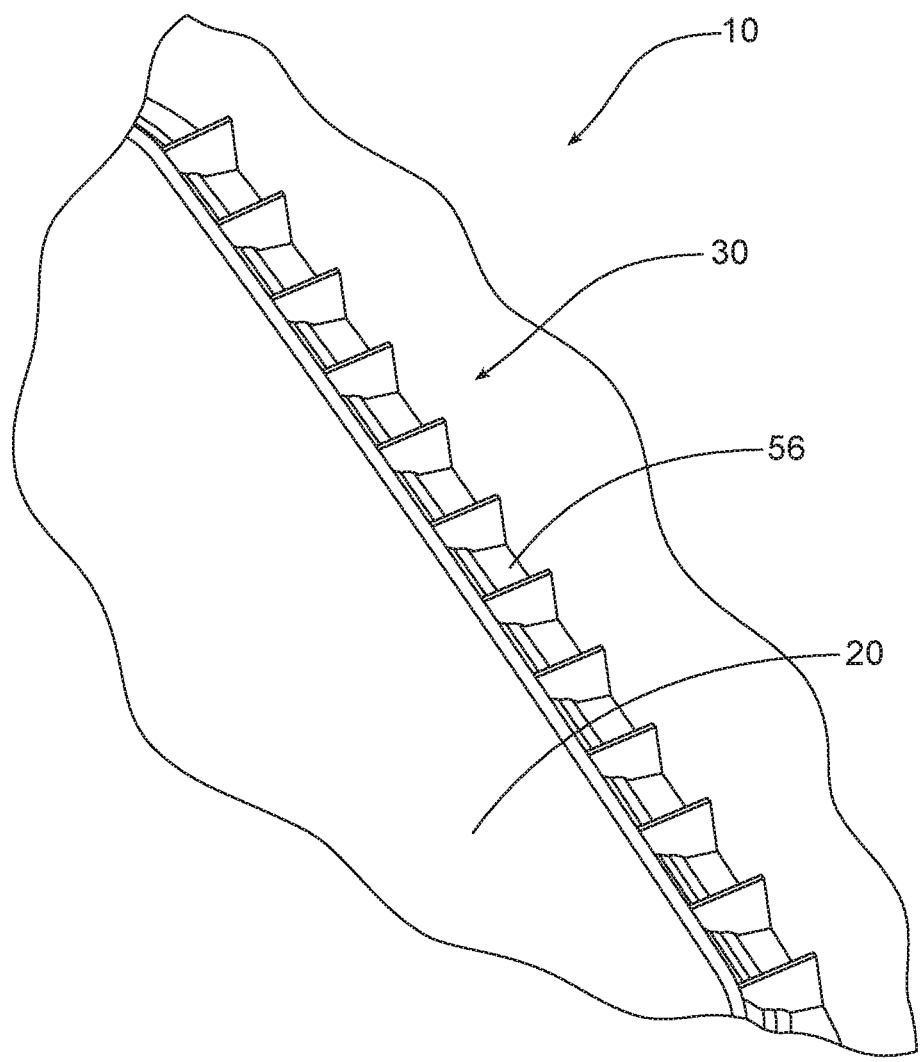
FIG. 7 is a view of yet another alternative embodiment of the segmented headliner wherein the illustrated segment includes a secondary component in the form of a portion of a trim ring adapted to receive and reinforce the central opening for a panorama roof or a sun roof assembly.

In the embodiment illustrated in FIG. 7, the headliner system 10 includes a secondary component 30 in the form of a portion of a trim ring 56 that is adapted to outline the central opening 20. As should be appreciated, the trim ring 56 functions to reinforce the headliner system 10 so that the headliner better holds its shape around the central opening.

Figure 8:
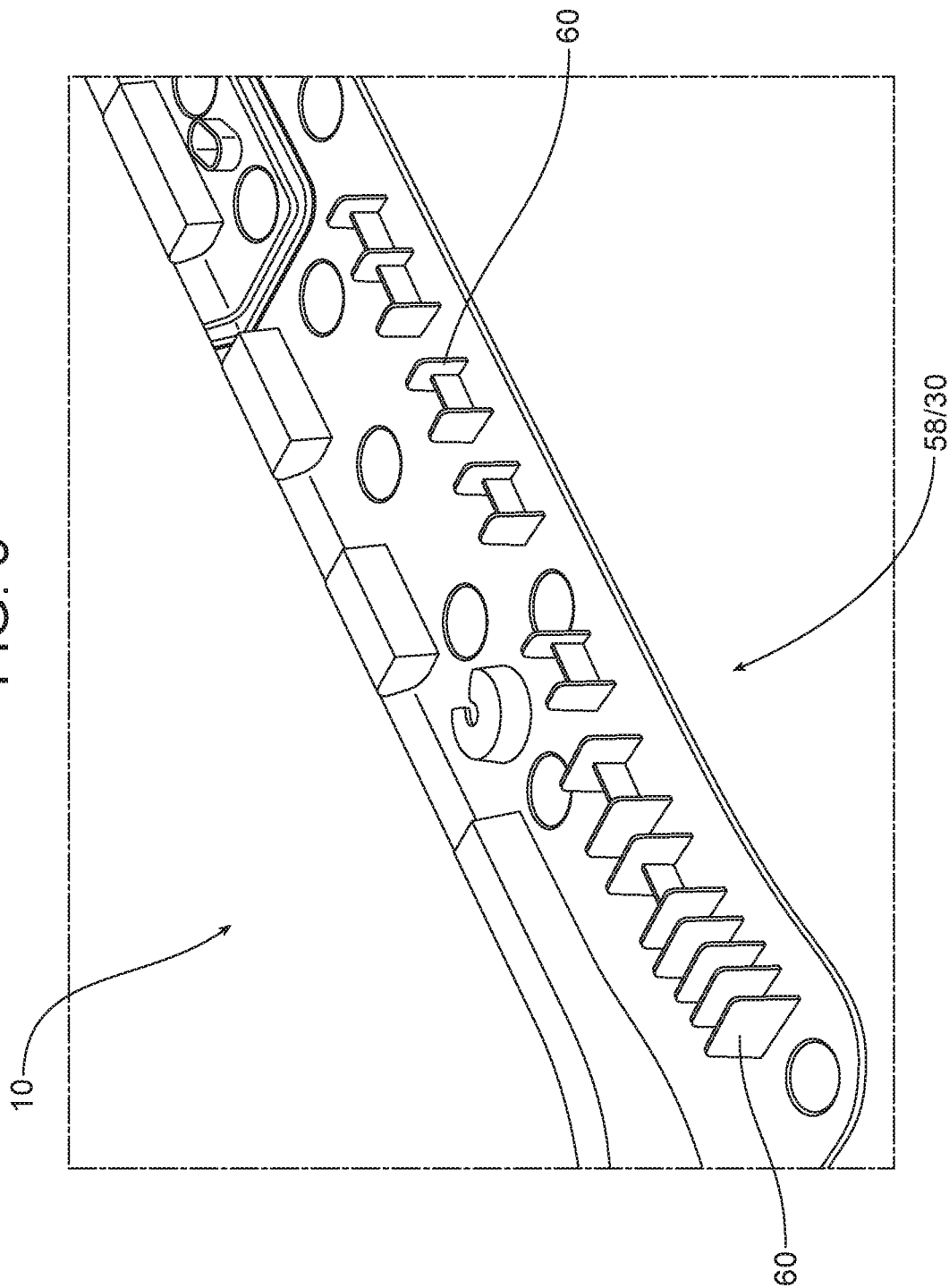
FIG. 8 is a detailed perspective view of a portion of an energy absorbing rib structure of the type that may be injection molded onto the B surface of the substrate of a segment of the segmented headliner.

FIG. 8 illustrates an integral energy absorbing feature 58 that may be the secondary component 30 on yet another embodiment of the headliner system 10. More particularly, that energy absorbing feature 58 includes a plurality of ribs 60 adapted to absorb energy in the event of an impact of the head or other part of an occupant against the headliner in an effort to mitigate injury.

Figure 3A:
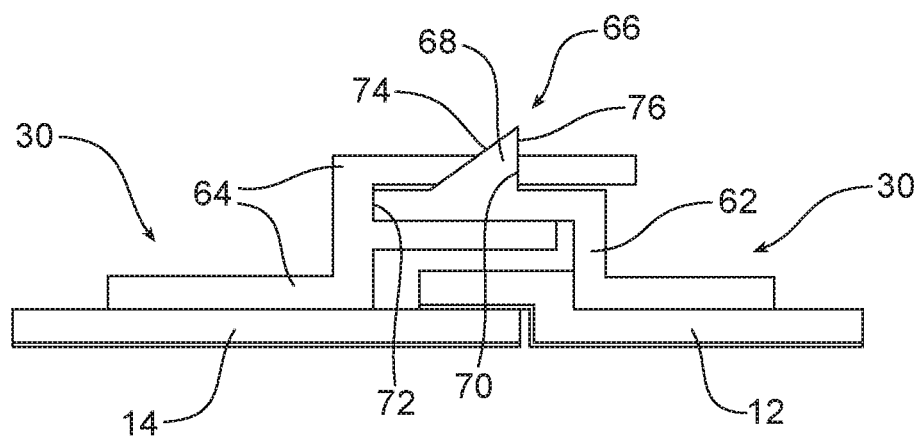
FIG. 3A illustrates a first possible embodiment of the segmented headliner wherein the first segment and the second segment are joined by a fastening feature including a snap tab carried on a first flange and a snap tab receiver carried on a second flange.

As illustrated in FIGS. 3A-3E, the secondary component 30 may be adapted to function to join the various segments 12, 14, 16, 18 of the headliner system 10 together. As illustrated in FIG. 3A, the first segment 12 includes a secondary component 30 comprising a first flange 62 while the second segment 14 includes a secondary component comprising a second flange 64. A fastening feature 66 secures the first segment 12 and the second segment 14 by joining the two flanges 62, 64. More particularly, in the embodiment illustrated in FIG. 3A, the fastening feature comprises a snap tab 68 carried on the first flange 62 and a snap tab receiver 70 carried on the second flange 64. More particularly, the first segment 12 is joined to the second segment 14 by inserting the first flange 62 into the channel 72 of the second flange 64 until the snap tab 68 is received and held in the snap tab receiver 70. Here it should be appreciated that the cam surface 74 of the leading face of the snap tab 68 aids in insertion of the snap tab into the snap tab receiver 70 while the shoulder 76 of the trailing surface resists disconnection.

Figure 3B:
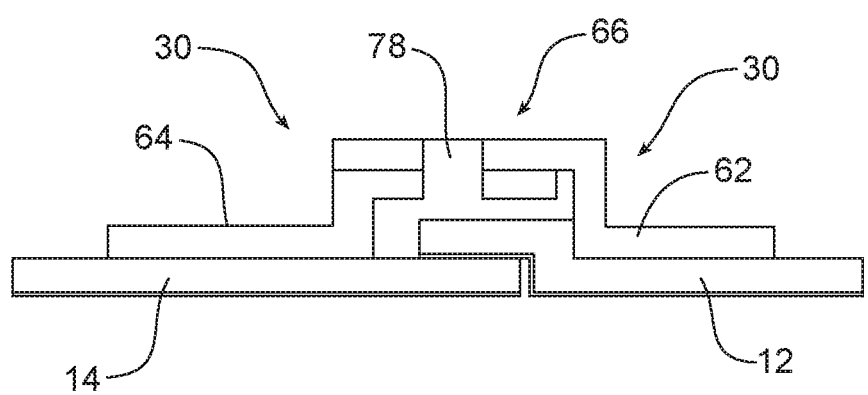
FIG. 3B illustrates an alternative embodiment of the segmented headliner wherein the fastening feature comprises a heat stake fusing a first flange on the first segment to a second flange on the second segment.

In the embodiment illustrated in FIG. 3B, the fastening feature 66 is a heat stake 78 joining the overlapping first flange 62 on the first segment 12 with the second flange 64 on the second segment 14.

Figure 3C:
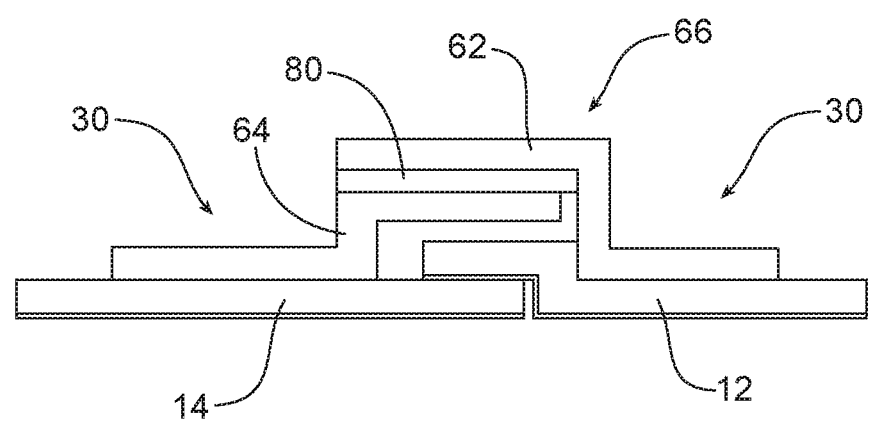
FIG. 3C illustrates an alternative embodiment including a fastening feature comprising an adhesive, in the form of a hot melt, securing the first flange on the first segment to the second flange on the second segment.

In the embodiment illustrated in FIG. 3C, the fastening feature 66 is an adhesive 80 joining the juxtaposed surfaces of the overlapping first flange 62 on the first segment 12 and second flange 64 on the second segment 14. That adhesive may, for example, comprise a hot melt.

Figure 3D:
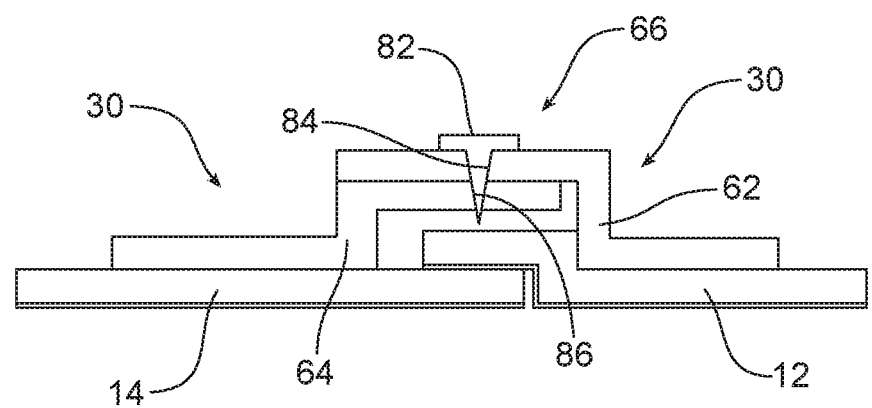
FIG. 3D illustrates another alternative embodiment including a fastening feature in the form of a snap fastener that is received in a first fastener receiver in the first flange of the first segment and a second fastener receiver in the second flange of the second segment.

In the embodiment illustrated in FIG. 3D, the fastening feature 66 comprises a snap fastener 82 received through a first fastener receiver 84 in the first flange 62 of the first segment 12 and a second fastener receiver 86 in the second flange 64 of the second segment 14.

Figure 3E:
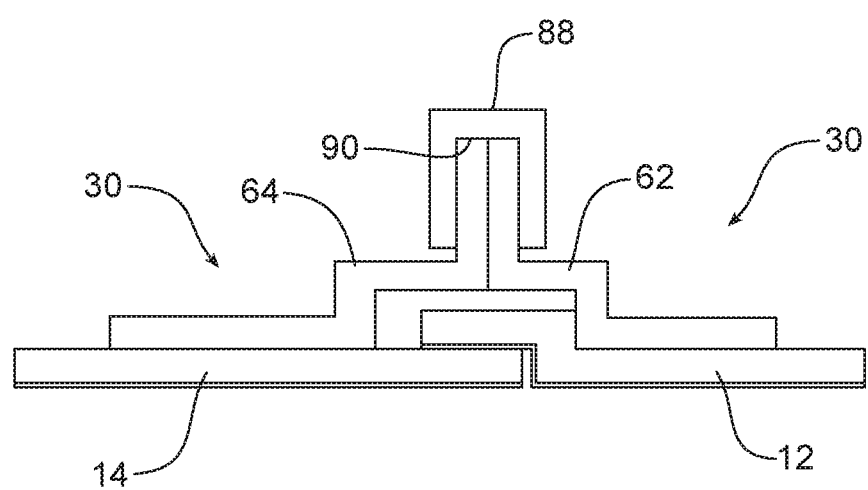
FIG. 3E illustrates yet another alternative embodiment of the segmented headliner including a fastening feature in the form of a clamp having a channel receiving a first flange of the first segment and a second flange of the second segment and holding those two flanges together.

In the embodiment illustrated in FIG. 3E, the fastening feature 66 is a resilient clamp 88 having a channel 90 that receives the overlapping first flange 62 and second flange 64 of the respective first and second segments 12, 14, and positively holds those flanges and segments together.

While FIGS. 3A-3E illustrate various methods and structures for joining the first segment 12 and the second segment 14, it should be appreciated that these same methods and structures may be utilized to join all four segments 12, 14, 16, 18 and the central section 21 together as illustrated in FIG. 1.

Any of the headliner segments 12, 14, 16, 18 may be produced in the manner schematically illustrated in FIG. 9. As illustrated, a GMT blank B is heated to a desired temperature for processing the blank into the headliner substrate 24. This heating may be performed in the oven O. The preheated blank B is then loaded into the combined thermoforming and injection molding apparatus A.

This is then followed by the step of thermoforming the blank B into the headliner substrate 24 and simultaneously injection molding the secondary component 30 onto the B surface 28 of the headliner substrate. Toward this end, the combined thermoforming and injection molding apparatus A of the illustrated embodiment includes a stationary platen SP and a cooperating displaceable platen DP to complete the thermoforming and compression molding of the blank B into the substrate 24. A clamping cylinder C displaces the displaceable platen DP in the desired manner.

The combined thermoforming and injection molding apparatus A also includes an injection molding section having a feed hopper H, for receiving plastic material in the form of pellets or the like, a feed screw or auger FS for delivering the plastic material M toward the injection molding nozzle N, a drive motor DM for turning the feed screw and a cylinder CY for reciprocating the feed screw through the barrel BA.

The headliner substrate 24 is cured following thermoforming and injection molding and before laminating. In addition, the headliner substrate 24 may be trimmed as necessary following thermoforming and injection molding and before laminating. That trimming may be performed during curing. Further, it should be appreciated that the trimming may include cutting any necessary holes in the headliner substrate 24 as required for the particular motor vehicle application for which the headliner system 10 is to be used.

As further illustrated, the headliner substrate 24 may then be transferred from the combined thermoforming and injection molding apparatus A to the laminating press P. This is then followed by the step of laminating the surface covering 32 to the A surface 26 of the headliner substrate 24.

It should be appreciated that more than one segment 12, 14, 16, 18 of the headliner system 10 may be processed at a time. For example, FIG. 2 illustrates a first platen 92 for simultaneously forming the first segment/front header 12 and second segment/rear header 14 and a second platen 94 for simultaneously forming the third segment/right hand side rail 16 and fourth segment/left hand side rail 18.

Reference is now made to FIGS. 10-18 which illustrate the various panels 100, 200, 300, 400, 500, 600, 700, 800 of the central section 21 in detail.

FIG. 10 illustrates a central section 21 that comprises an aesthetic roof panel including a cover layer 23 exhibiting aesthetic qualities that may be designed to distinguish the central section from the surrounding segments 12, 14, 16, 18. That cover layer 23 may comprise substantially any appropriate material providing a desired aesthetic appearance such as, for example, leather, suede, alcantara, wood grain, metallic film, different patterns of camouflage or the like. The cover layer 23 may also include, for example, an embroidered symbol 25 such as the illustrated mustang or any other desired symbol including, but not necessarily limited to, a company name, logo or the like.

As illustrated in FIG. 11, in an alternative embodiment, the central section 21 may comprise a noise, vibration and harshness panel 100 including a substrate 102 made from a sound insultation material covered by an aesthetic cover layer 104 that is exposed to the interior passenger compartment of the motor vehicle.

As illustrated in FIGS. 12A and 12B, the central section 21 may comprise a radiant heat source panel 200 including a support 202, in the form of a core or sound insulating substrate backing a radiant heat source 204. Spacers 206 maintain a space 208 between the radiant heat source 204 and the aesthetic cover sheet 210 oriented toward the passenger cabin of the motor vehicle.

As illustrated in FIG. 13, the central section 21 may comprise a reflective heat source panel 300 including a support substrate 302 made of, for example, sound insulating material, a heat reflective material 304, such as a metallic film to reflect radiant heat away from the passenger compartment, and an aesthetic cover layer 306 oriented toward the passenger compartment.

As illustrated in FIGS. 14A-14C, the central section 21 may comprise a multisection panel incorporating an air bag grid system 400.

With reference to FIGS. 14A and 14B, wherein like numerals indicate like parts, a vehicle 420 includes a roof 422, and a first row 424 and a second row 426 of airbags 428 supported by the roof 422. The first row 424 and second row 426 of airbags 428 are elongated along a vehicle-longitudinal axis A1. The vehicle 420 includes a third row 430 and a fourth row 432 of airbags 428 supported by the roof 422, elongated along a vehicle-lateral axis A2. The third row 430 and fourth row 432 of airbags 428 intersect the first row 424 and the second row 426 of airbags 428. The airbags 428 of the intersecting rows 424, 426, 430, 432 are selectivity inflatable, e.g., based on positions of occupants 434 of the vehicle 420, e.g., to increase the effectiveness of controlling kinematics of such occupants 434 inside the vehicle 420 during a vehicle impact.

The numerical adjectives "first," "second," "third," etc., are used throughout this document as identifiers and are not intended to signify importance or order.

The vehicle 420 may be any passenger or commercial automobile such as a car, a truck, a sport utility vehicle, a crossover vehicle, a van, a minivan, a taxi, a bus, etc.

The vehicle 420 defines the vehicle-longitudinal axis A1, i.e., extending between a front and a rear of the vehicle 420. The vehicle 420 defines the vehicle-lateral axis A2, i.e., extending between a left side and a right side of the vehicle 420. The vehicle-longitudinal axis A1 and the vehicle-lateral axis A2 may be perpendicular to each other. The front, rear, left side, and right side may be relative to an orientation of an operator of the vehicle 420. The front, rear, left side, and right side may be relative to an orientation of controls for operating the vehicle 420, e.g., an instrument panel, etc. The front, rear, left side, and right side may be relative to a forward driving direction when wheels of the vehicle 420 are all parallel with each other.

The vehicle 420 defines a passenger cabin 436. The passenger cabin 436 may be occupied by one or more occupants 434 of the vehicle 420.

The roof 422 provides cover for occupants 434 of the passenger cabin 436. The roof 422 may include cross-beams 438, an exterior panel 440, and a headliner 442. The cross-beams 438 support the exterior panel 440, the headliner 442, etc. The cross-beams 438 may be steel, aluminum, carbon fiber, or any other suitable material. The cross-beams 438 may be elongated along the vehicle-lateral axis A2. The headliner 442 and the exterior panel 440 provide class-A surfaces to the roof 422, i.e., surfaces specifically manufactured to have a high-quality, finished aesthetic appearance free of blemishes, etc.

The headliner 442 may include tear seams. The tear seams are designed to rupture upon inflation of the one or more of the airbags 428. The tear seams may be weaker than a portion of the headliner 442 adjacent the tear seams, e.g., the tear seams may be thinner, a weaker material, etc. The tear seams may connect panels of the headliner 442, e.g., with breakaway stitches. The tear seams may extend along the vehicle-longitudinal axis A1 and/or the vehicle-lateral axis A2.

The vehicle 420 may include one or more seats 444. The each of the seats 444 shown is a bucket seat, but alternatively the seats 444 may be a bench seat 444 or another type of seat 444. The seats 444 may be supported by a floor of the vehicle 420.

The seat 444 may include a seat back, a seat bottom, and a headrest. The headrest may be supported by the seat back and may be stationary or movable relative to the seat back. The seat back may be supported by the seat bottom and may be stationary or movable relative to the seat bottom. The seat back, the seat bottom, and/or the headrest may be adjustable in multiple degrees of freedom. Specifically, the seat back, the seat bottom, and/or the headrest may themselves be adjustable, in other words, adjustable components within the seat back, the seat bottom, and/or the headrest, and/or may be adjustable relative to each other.

The seats 444 may be along the vehicle-lateral axis A2. For example, the seats 444 may be arranged in rows extending between the right side and the left side of the vehicle 420. For example, some of the seats 444 may be spaced along the vehicle-lateral axis A2 at a common distance from the front of the vehicle 420. The seats 444 may be spaced from each other along the vehicle-lateral axis A2.

The seats 444 may be spaced from each other along the vehicle-longitudinal axis A1. For example, one of the seats 444 may be in front of another of the seats 444. To put it another way, one of the seats 444 may be closer to the front of the vehicle 420 than another of the seats 444. For example, the seats 444 may be arranged in multiple rows, e.g., a first row, a second row, etc., between the front and the rear of the vehicle 420. The first row may be in front of the second row. To put it another way, the first row may be between the second row and the front of the vehicle 420.

The vehicle 420 may include an airbag assembly 446. The airbag assembly 446 may include a housing 448, one or more inflators 450, and the airbags 428. The airbags 428 are independently inflatable from uninflated positions to inflated positions, e.g., the inflators 450 may actuate to inflate the airbags 428 in response to an instruction received from a computer 452. In other words, any one or more of the airbags 428 may be inflated based on the position of one or more occupants in the passenger cabin 436. The inflators 450 and the airbags 428 may be disposed in the housing 448 in the uninflated positions.

The housing 448 provides a reaction surface for the airbags 428 in the inflated positions, as shown in FIG. 14B. The housing 448 may be supported by the roof 422 or at any other suitable location of the vehicle 420. For example, the housing 448 may be fixed to one or more of the cross-beams 438, e.g., with fasteners, etc. (see FIG. 14C). The housing 448 may be under the cross-beams 438. To put it another way, the housing 448 may be between the cross-beams 438 and the headliner 442. The housing 448 may be any material, e.g., a rigid polymer, a metal, a composite, etc. Although all the airbags 428 are shown supported by the single housing 448, it is to be understood that multiple housings 448 may support the airbags 428, e.g., some of the airbags 428 may be supported by one housing, and other airbags 428 may be supported by another housing.

Each airbag 428 may be formed of a woven polymer or any other material. As one example, the airbags 428 may be formed of woven nylon yarn, for example, nylon 6-6. Other examples include polyether ether ketone (PEEK), polyetherketoneketone (PEKK), polyester, etc. The woven polymer may include a coating, such as silicone, neoprene, urethane, etc. For example, the coating may be polyorgano siloxane.

The airbags 428 are supported by the roof 422. For example, the airbags 428 may be fixed to the housing 448 supported by the roof 422. The airbags 428 may be arranged into rows, e.g., the first row 424, the second row 426, the third row 430, the forth row 432, a fifth row 454, a sixth row 456, etc. Some of the rows 424, 426, 454 of the airbags 428 are elongated along a first axis, e.g., the vehicle-longitudinal axis A1. Some of the rows 430, 432, 456 of the airbags 428 are elongated along a second axis perpendicular to the first axis, e.g., the vehicle-lateral axis A2. The rows 424, 426, 454 of airbags 428 elongated along the first axis, e.g., the vehicle-longitudinal axis A1, intersect the rows 430, 432, 456 of airbags 428 elongated along the second axis, e.g., the vehicle-lateral axis A2. For example, the rows 424, 426, 454 of airbags 428 elongated along the first axis, e.g., the vehicle-longitudinal axis A1, and the rows 430, 432, 456 of airbags 428 elongated along the second axis, e.g., the vehicle-lateral axis A2, may define a plurality of rectangles. To put it another way, the rows 424, 426, 454 of airbags 428 elongated along the first axis, e.g., the vehicle-longitudinal axis A1, and the rows 430, 432, 456 of airbags 428 elongated along the second axis, e.g., the vehicle-lateral axis A2, may be arranged in a grid.

Each airbag 428 in the inflated position extends downward from the roof 422. To put it another way, each airbag 428 in the inflated position may extend from the roof 422 toward the floor. One of the airbags 428 of the rows 424, 426, 454 of airbags 428 elongated along the first axis, e.g., the vehicle-longitudinal axis A1, in the inflated position may be between seats 444 of one of the rows of seats 444. To put it another way, seats 444 of one of the rows of seats 444 may be on opposite sides of one of the airbags 428 of the rows 424, 426, 454 of airbags 428 elongated along the vehicle-longitudinal axis A1 in the inflated position. One of the airbags 428 of the rows 430, 432, 456 of airbags 428 elongated along the second axis, e.g., the vehicle-lateral axis A2, in the inflated position may be between one of the seats 444 of one of the rows of seats 444 and one of the seats 444 of another of the row of seats 444. To put it another way, the airbag 428 of one the rows 430, 432, 456 of airbags 428 elongated along the vehicle-lateral axis A2 may be between the first row of seats 444 and the second row of seats 444, between the second row of seats 444 and the third row of seats 444, etc., in the inflated position.

The airbags 428 in the inflated position may surround one or more of the seats 444. For example, one airbag 428 from one of the rows 424, 426, 454 of airbags 428 elongated along the vehicle-longitudinal axis A1, one airbag 428 from another of the rows 424, 426, 454 of airbags 428 elongated along the vehicle-longitudinal axis A1, one airbag 428 from one of the rows 430, 432, 456 of airbags 428 elongated along the vehicle-lateral axis A2, and one airbag 428 from another of the rows 430, 432, 456 of airbags 428 elongated along the vehicle-lateral axis A2 in the inflated positions may collectively define a polygon. One or more of the seats 444 may be within such polygon.

The airbags 428 may be releasably fixed to each other. For example, one of the airbags 428 of one of the rows 424, 426, 454 of airbags 428 elongated along the vehicle-longitudinal axis A1 may be releasably fixed to another airbag 428 of such row. As another example, one of the airbags 428 of one of the rows 430, 432, 456 of airbags 428 elongated along the vehicle-lateral axis A2 may be releasably fixed to another airbag 428 of the row. As a final example, one of the airbags 428 of one of the rows 430, 432, 456 of airbags 428 elongated along the vehicle-lateral axis A2 may be releasably fixed to one of the airbags 428 of one of the rows 424, 426, 454 of airbags 428 elongated along the vehicle-longitudinal axis A1.

The airbags 428 may be releasably fixed to each other along a vertically extending side edge 458 of one of the airbags 428 in the inflated positions. For example, breakaway stitching 460 may be used to fix the vertically extending side edge 458 of one airbag 428 to a vertically extending side 458 of another airbag 428, to a panel of another airbag 428, etc. The break-away stitching 460 secures airbags 428 adjacent each other in the inflated positions to each other, e.g., inhibiting an occupant 434 of the passenger cabin 436 from passing between such airbags 428 during a vehicle impact. The break-away stitching 460 (or other structure for releasably fixing the airbags 428 to each other, such as adhesive having a certain strength, perforated panels, etc.) may cease fixing adjacent airbags 428 to each other, e.g., by breaking, when one of such airbags 428 is inflated and not the other airbag 428. To put it another way, relative moment between adjacent airbags 428 caused by inflation of one of such airbags 428, and not the other of such airbags 428, may release such airbags 428 from being fixed to each other.

The vehicle 420 may include one or more inflators 450 for inflating the airbags 428 to the inflated positions. The inflators 450 provides inflation medium to inflate the airbags 428 from the uninflated position to the inflated position. Each inflator 450 may be, for example, a pyrotechnic inflator that uses a chemical reaction to drive inflation medium to the airbag 428. The inflators 450 may be of any suitable type, for example, a cold-gas inflator. Each inflator 450 may be in fluid communication with one or more of the airbag 428, e.g., directly, through various piping, etc. For example, one inflator 450 may provide inflation medium to multiple airbags 428. As another example, one inflator 450 may only provide inflation medium to one airbag 428. The inflators 450 may be supported by the housing 448, the roof 422, or by any other suitable location of the vehicle 420.

The airbag assembly 446 may include a plurality of shutoff valves (not shown) between one or more of the inflators 450 and one or more of the airbags 428. Each shutoff valve actuates between an open position in which fluid is permitted to flow through the shutoff valve and a closed position is which fluid is inhibited from flowing through the shutoff valve. Each shutoff valve may actuate to the open position or the closed position in response to an instruction from the computer 452. The shutoff valves enable inflation medium from the inflator 450 to be selectively provided to one or more of the airbags 428. For example, one or more of the inflators 450 may be in fluid communication with a common rail (not shown). The common rail may be in fluid communication with one or more shutoff valves. Actuation of one or more of the valves to the closed positions inhibits inflation medium from flowing from the common rail to one or more airbags 428 in fluid communication with such shutoff valves. Actuation of one or more of the valves to the open positions permits inflation medium to flow from the common rail to one or more airbags 428 in fluid communication with such shutoff valves.

The vehicle 420 may include one or more occupancy sensors (not shown). The occupancy sensors are configured to detect a position of occupants 434 of the vehicle 420, e.g., within the passenger cabin 436. For example, the occupancy sensors may be weight sensors supported by the seats 444. As another example, the occupancy sensor may be a camera positioned to capture images of the passenger cabin 436, e.g., supported by the roof 422, or any other suitable location of the vehicle 420.

The vehicle 420 may include at least one impact sensor 468 for sensing impact of the vehicle 420. The impact sensor 468 may be in communication with the computer 452. The impact sensor 468 is configured to detect an impact to the vehicle 420. Alternatively or additionally to sensing impact, the impact sensor 468 may be configured to sense impact prior to impact, i.e., pre-impact sensing. The impact sensor 468 may be of any suitable type, for example, post contact sensors such as accelerometers, pressure sensors, and contact switches; and pre-impact sensors such as radar, LIDAR, and vision sensing systems. The vision systems may include one or more cameras, CCD image sensors, CMOS image sensors, etc. The impact sensor 468 may be located at numerous points in or on the vehicle 420.

The vehicle 420 may include a communication network (not shown). The communication network includes hardware, such as a communication bus, for facilitating communication among vehicle 420 components, e.g., the computer 452, the impact sensor 468, the occupancy sensors, the inflators 450, the shutoff valves, etc. The communication network may facilitate wired or wireless communication among the vehicle 420 components in accordance with a number of communication protocols such as controller area network (CAN), Ethernet, WiFi, Local Interconnect Network (LIN), and/or other wired or wireless mechanisms.

The computer 452 may be a microprocessor based computer implemented via circuits, chips, or other electronic components. For example, the computer 452 may include a processor, a memory, etc. The memory of the computer 452 may include memory for storing programming instructions executable by the processor as well as for electronically storing data and/or databases.

The computer 452 may by programmed to detect positions of occupants 434 of the passenger cabin 436, e.g., based on information from the occupancy sensors. For example, information from the weight sensor in one of the seats 444 indicating weight above a threshold may indicate such seat 444 is occupied. As another example, image data from the camera may be analyzed by the computer 452 using image recognition programming to identify positions of occupants 434 of the passenger cabin 436.

The computer 452 may be programmed to actuate one or more of the inflators 450, e.g., to provide an impulse to a pyrotechnic charge of one or more of the inflators 450 when the impact sensor 468 senses an impact of the vehicle 420. The computer 452 may selective actuate the inflators 450. To put it another way, the computer 452 may actuate some of the inflators 450, and not actuate others. For example, each inflator 450 may be associated with a network address, e.g., identifying a specific inflator 450 as a node on a network, and the computer 452 may transmit an actuation instruction to certain network addresses. Other programming, methods, and techniques may be used by the computer 452 to selectively actuate the inflators 450.

The computer 452 may be programmed to actuate one or more of the valves. For example, the computer 452 may transmit an instruction to one or more of the valves indicating actuation to the open position or to the closed position. The computer 452 may selectively actuate the valves. For example, each valve may be associated with a network address, e.g., identifying a specific valve as a node on a network, and the computer 452 may transmit an actuation instruction to certain network addresses. Other programming, methods, and techniques may be used by the computer 452 to selectively actuate the valves.

The computer 452 may be programmed to select one or more airbags 428 of the rows 424, 426, 430, 432, 454, 456 of airbags 428 for inflation based on a detected position of occupants 434 in passenger cabin 436. For example, the rows 424, 426, 430, 432, 454, 456 of airbags 428 may define cells 472. To put it another way, the cells 472 may be bordered by airbags 428 of the rows 424, 426, 430, 432, 454, 456 of airbags 428. For example, one airbag 428 of each the first row 424, the second row 426, the third row 430 and the fourth row 432 may define one cell 472. The computer 452 may identify certain of the cells 472 based on the detected position of the occupants 434 in the passenger cabin 436. For example, the computer 452, the computer 452 identify one or more cells 472 that are above the detected positions of the occupants 434. The computer 452 may select the airbags 428 that border the identified cells 472 as a group of airbags 428 for inflation. The computer 452 may refine the group airbags 428 by removing from the group airbags 428 whose inflated positions conflict with the detected positions of the occupants 434 of the passenger cabin 436. For example, the computer 452 may remove airbags 428 positioned above the detected position of the occupants 434 from the group of airbags 428. To put it another way, the computer 452 may select the airbags 428 that border the identified cells 472, less any airbags 428 that would contact an occupant 434 in the inflated positions, as the group of airbags 428 for inflation. The computer 452 may use other techniques to select one or more airbags 428 of the rows 424, 426, 430, 432, 454, 456 of airbags 428 for inflation based on the detected position of occupants 434 in passenger cabin 436.

The computer 452 may be programmed to actuate the group of one or more airbags 428 selected for inflation. For example, the computer 452 may store a look up table or the like associating one or more of the airbags 428 of the rows 424, 426, 430, 432, 454, 456 of airbags 428 with a certain inflator 450, e.g., with a network address of a certain inflator 450, associating one or more of the airbags 428 of the rows 424, 426, 430, 432, 454, 456 of airbags 428 with a certain valve, e.g., with a network address of a certain valve.

To actuate the selected airbags 428, the computer 452 may transmit one or more instructions by transmitting instructions to certain network addresses associated with certain valves and certain inflators 450, e.g., instructing actuation of one or more of the valve to the open position or the closed position, instructing actuation of one or more of the inflators 450 to provide inflation medium, etc. For example, the computer 452 may transmit an instruction to one or more inflators 450 associated with the selected airbags 428 instructing actuation to provide inflation medium to the selected airbags 428. As another example, the computer 452 may transmit an instruction to one or more valves associated with the selected airbags 428 to actuate to the open position and/or an instruction to one or more valves not associated with the selected airbags 428 to actuate to the closed position. Next, the computer 452 may transmit an instruction to one or more inflators 450, e.g., to provide inflation medium via the valves in the open position to the selected airbags 428.

The computer 452 may actuate the selected airbags 428 in response to detecting a vehicle impact. For example, the computer 452 may actuate the one or more inflators 450 to inflate the selected airbags 428 upon detecting a vehicle impact, e.g., based on information from the impact sensor 468. As another example, the computer 452 may actuate the valves upon detecting a vehicle 420 pre-impact, e.g., based on information from the impact sensor 468 indicating that a vehicle impact is likely to occur, and then actuate the one or more inflators 450 upon detecting a vehicle impact, e.g., based on information from the impact sensor 468 indicating that a vehicle impact has occurred.

As illustrated in FIGS. 15A and 15B, the central section 21 may comprise a display panel 500 including a display 502. The display 502 may, for example, comprise a liquid crystal display or a screen upon which still or moving images may be projected. Projected images may include, for example, advertising, scrolling text for news, weather, welcome messages or expected arrival time to a particular destination. In the illustrated embodiment, the display 502 is pivotally attached to the panel 500 by means of hinges 504. FIG. 15A illustrates the display 502 in a stowed position nested within a cavity 506 in the panel 500. In FIG. 15B, the display 502 is folded down from the panel 500 into a deployed position. In some of the embodiments, the display 502 may comprise touch screen technology.

As illustrated in FIGS. 16A and 16B, the central section 21 may comprise a central panel 600 with a pull down divider 602. In the illustrated embodiment, the pull down divider 602 is a roller shade that may be stowed on the roller 604 or pulled down by the handle 606 and deployed from the roller 604. That roller 604 is hidden from view in the cavity 608 formed in the sound insulation substrate 610 above the aesthetic cover layer 612. The pull down divider 602 is illustrated in the stowed position in FIG. 16A and in the deployed position in FIG. 16B.

As illustrated in FIG. 17, the central section 21 may comprise a panorama roof panel 700. In the illustrated embodiment, the panorama roof panel 700 comprises a transparent material that is fixed in place in the opening defined by the headliner segments 12, 14, 16, 18.

As illustrated in FIG. 18, the central section 21 may comprise a sun roof panel 800. In the illustrated embodiment, the sun roof panel 800 includes three different sections: a forward section 802, a rearward section 804 and a fixed mid section 806. The forward section 802 and the rearward section 804 may be opened and closed as desired by means of powered actuators of a type known in the art (not shown).

The headliner system 10 is useful in a method of reducing headliner production costs for a motor vehicle product line. That method includes the steps of: (a) producing a plurality of headliner segments 12, 14, 16, 18, (b) connecting that plurality of headliner segments together and outlining a central opening 20 with those plurality of headliner segments and (c) inserting a central section 21 into the plurality of headliner segments. For purposes of this document and the following claims, the connecting and inserting steps may be performed sequentially or simultaneously.

The method may also include selecting the central section 21 from a group of interchangeable central sections or panels consisting of a noise, vibration and harshness panel 100, a radiant heat source panel 200, a reflective heat source panel 300, a multisection panel incorporating an overhead air bag grid system 400, a display panel 500, a central panel 600 including a pull-down divider 602, a central section/aesthetic roof panel, a panorama roof panel 700 and a sun roof panel 800.

The method may also include the step of simultaneously thermoforming a blank into the plurality of headliner segments 12, 14, 16, 18 and injection molding a secondary component 30 onto the headliner segments. Further, the method may include laminating a surface covering 32 to the headliner segments.

The foregoing has been presented for purposes of illustration and description. It is not intended to be exhaustive or to limit the embodiments to the precise form disclosed. Obvious modifications and variations are possible in light of the above teachings. For example, where the headliner system 10 is to be incorporated into a motor vehicle having a full roof, a fifth segment 96 of the headliner may be provided for closing the central opening 20 formed by the first segment 12, second segment 14, third segment 16 and fourth segment 18 (see FIG. 10). The fifth segment 96 may be secured to the first segment 12, second segment 14, third segment 16 and fourth segment 18 in the same manner as the first and second segments are joined together in any of the FIGS. 3A-3E or by other appropriate means.

All such modifications and variations are within the scope of the appended claims when interpreted in accordance with the breadth to which they are fairly, legally and equitably entitled.

What is claimed:

1. A headliner system, comprising:
a plurality of segments connected together and outlining a central opening; and
a central section received in and closing said central opening, wherein said central section comprises a panel configured in a grid arrangement incorporating an overhead airbag grid system, the overhead airbag grid system comprising a plurality of airbags positioned above a plurality of seats so that in the inflated position the plurality of airbags surround each of the plurality of seats such that a first airbag is elongated along a first vehicle longitudinal axis on one side of a first seat, a second airbag is elongated along a second vehicle longitudinal axis on a second side of the first seat, a third airbag is elongated along a first vehicle lateral axis on a front side of a vehicle seat, and a fourth airbag is elongated along a second vehicle lateral axis on a rear side of the first seat.

2. The headliner system of claim 1, wherein each of said plurality of segments comprises (a) a unitary body including a substrate having an A-surface and a B-surface, (b) a secondary component carried on the B-surface and (c) a laminated surface covering on said A-surface.

3. The headliner system of claim 1, wherein (a) said multisection panel incorporating said overhead airbag grid system, (b) said panel incorporating said fold-down display panel and (c) said panel incorporating said pull down divider are interchangeable in said central opening.

4. The headliner system of claim 1, wherein said plurality of airbags are independently inflatable.

5. The headliner system of claim 4, further including a plurality of inflators connected to said plurality of airbags.

6. The headliner system of claim 5, further including a computer, said plurality of inflators being adapted to independently inflate said plurality of airbags in response to instructions received from said computer.

7. The headliner system of claim 6, wherein when inflated said plurality of airbags extend downward from said panel between the seats of a motor vehicle into which said headliner system is incorporated.

8. The headliner system of claim 6, wherein when inflated said plurality of airbags extend downward from said panel and surround a seat of a motor vehicle into which said headliner system is incorporated.

9. The headliner system of claim 6, wherein a first airbag of said plurality of airbags is releasably fixed to a second airbag of said plurality of airbags.

10. The headliner system of claim 6, wherein said computer is configured to select one or more airbags of said plurality of airbags for inflation based on the detected position of the occupants in the motor vehicle.

11. The headliner system of claim 1, wherein a display is pivotally attached to the panel by a hinge.

12. The headliner system of claim 11, wherein said display may be stowed in a cavity in said panel.

13. The headliner system of claim 12, wherein the display comprises a touch screen.

14. The headliner system of claim 12, wherein the display is a liquid crystal display.

15. The headliner system of claim 12, wherein the display is a screen upon which an image is projected.

16. The headliner system of claim 1, wherein a pull down divider is a roller shade.

17. The headliner system of claim 16, wherein said roller shade includes a roller and a handle.

18. The headliner system of claim 17, wherein the roller is hidden from view in a cavity formed in the panel.

* * * * *